(12) United States Patent
Gilger et al.

(10) Patent No.: US 11,803,531 B1
(45) Date of Patent: Oct. 31, 2023

(54) SYSTEM AND METHOD FOR KNOWLEDGE CURATION USING SEMANTIC OBJECT-BASED PRODUCTION AND ADAPTIVE PROCESS MANAGEMENT

(71) Applicant: Modus Operandi, Melbourne, FL (US)

(72) Inventors: Mike Dennon Gilger, Alachua, FL (US); Gian Michael Gill, Melbourne, FL (US); Gregory Brian Rogers, Melbourne, FL (US)

(73) Assignee: MODUS OPERANDI, INC., Melbourne, FL (US)

( * ) Notice: Subject to any disclaimer, the term of this patent is extended or adjusted under 35 U.S.C. 154(b) by 275 days.

(21) Appl. No.: 16/848,825

(22) Filed: Apr. 14, 2020

Related U.S. Application Data

(60) Provisional application No. 62/833,784, filed on Apr. 14, 2019.

(51) Int. Cl.
*G06F 16/00* (2019.01)
*G06F 16/22* (2019.01)
*G06F 16/93* (2019.01)
*G06F 16/21* (2019.01)

(52) U.S. Cl.
CPC ........ *G06F 16/2291* (2019.01); *G06F 16/219* (2019.01); *G06F 16/93* (2019.01)

(58) Field of Classification Search
CPC ..... G06F 16/2291; G06F 16/93; G06F 16/219
USPC ...................................................... 707/695
See application file for complete search history.

(56) References Cited

U.S. PATENT DOCUMENTS

2003/0208507 A1* 11/2003 Venkatram ............. G06Q 30/06

* cited by examiner

*Primary Examiner* — Chelcie L Daye
(74) *Attorney, Agent, or Firm* — Mark M. Friedman

(57) ABSTRACT

Intelligence production suffers from inadequate collaboration, poor information sharing, and lack of visibility into a complex production process, resulting in intelligence reports that are not aligned to the user's needs. This exacerbates decision-making problems by preventing critical data from reaching the appropriate staff, which prevents commanders from achieving their desired mission requirements due to incomplete or inadequate information. Using Object-Based Production, Adaptive Process Management, and Entity Management technologies, a new wiki-like capability was created that provides a wiki's ease of use and understanding while addressing weaknesses such as lack of multi-level security, no enforcement of publishing standards, and lack of product currency, providing an intelligence production solution addressing the above needs.

20 Claims, 24 Drawing Sheets

Fig. 6

SYSTEM AND METHOD FOR KNOWLEDGE CURATION USING SEMANTIC OBJECT-BASED PRODUCTION AND ADAPTIVE PROCESS MANAGEMENT

CROSS REFERENCE TO RELATED APPLICATIONS AND INCORPORATION BY REFERENCE

This non-provisional patent application is a non-provisional of, and claims benefit of priority to, U.S. provisional patent application Ser. No. 62/833,784, entitled NEXT-GEN WIKIS BUILT ON OBJECT-BASED PRODUCTION AND ADAPTIVE PROCESS MANAGEMENT, filed in the Unites States Patent and Trademark Office on April 14, 2019, which is hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for object-based adaptive process management and intelligence production. The system and method of the invention is an advancement on the state of the art of the production of knowledge to aid in the process of decision making for any purpose, include business purpose, military purposes or any other purpose, providing an automated process for updating of units of The management of document/information/knowledge management in a business can be quite difficult, even in the best situations. There are many disjointed, non-intelligent systems for capturing and storing information. For example, word processors such the original Microsoft products (and before them, Word Perfect and the Lotus suite, and before that—the initial electronic word processors) all drove the concept that a "document" is made up of a collection of text, and if lucky, has one set of attributes about the document (author, last edit, key words, company, subject, etc.) that may be an identifying characteristic of the information contained within that document. That concept alone drives a majority of the problems in the prior information and knowledge management space, as those documents get sent around (via email), with different versions, with some wondering what the most recent version is, and various tools existing to try and help the human merge changes in different versions of the same document. Said another way, the document-focused knowledge management systems of the prior art are woefully inadequate as information or knowledge management systems, and are poor tools for the production of intelligence.

Email is bad in its own way, with multiple threads, either overloading some with chatter, or excluding others with decision worthy information lost in the divergent email chain. Multiple copies of the threads exist with copies of all the original text, except when the email is answered out of order, and then multiple copies of different "history" of the email surface.

Wikis came in to help try and assist with the above—able to be edited by any user who has been granted permission to edit the wiki. There is "one" version of the document with various comments, and a deeper change log of who changed the document, though "last-in" creates overwrites of wiki information if two users were editing the same page, and each checks in their version—unaware of the other user's edits. Great for exchanging information between users and teams—content can be updated quickly, distribution is "automatic" (each refresh of the page shows the latest content), and it centralizes the information.

Wikis may have built-in version control. Every change is recorded, with a record of who made those changes and when (and sometimes why when the user enters the info), and reversion to an earlier version is very simple—though only at a full "page" level.

But prior art wikis are still plagued by some of the same issues as "documents" in that while tracking of changes is a little better, the whole page (equivalent typically to a word processing document) is still treated as a single "thing." One cannot roll back changes to a single artifact (paragraph, table, image, list, headers, etc.) on the page—if there were multiple changes made between "saves", one must roll back all of those changes to get back to the previous version. While an improvement over word processing files, the construct is still based on a monolithic "document" mentality. A wiki page is an unintelligent blob of text and tags, with no internal structural or semantic concept understood by the computer.

Wikis support far better "reuse" of components of that text blob—using (in some of the more sophisticated wikis) marked header areas of text in a page to be displayed as a reference in another page. This is not something done in a document management system, with various word document files. But even though this is an additional feature of a wiki, it too is lacking—the wiki blindly looks at another wiki page, searches for a tag, blindly copies all text/tags within that header's begin and end markers and displays it while rendering the current page. Again, this process is unintelligent. The wiki doesn't understand what is being copied, doesn't understand what it is, it just runs through the motions. It can't even look to see which authors impacted that copied text, and when they impacted it. The change log is just that—a simple "user X saved the current blob on this date. It doesn't know what changed, it just stores the new blob as the "active" blob. When you go back in time, you pick a previous version, and that blob becomes the "active" blob with a new revision level. There is no understanding by the wiki who touched what paragraph, and when.

Even references are minimally aware within the wiki. It looks for a tag, and has associated text for that tag, and it just puts the text in that tag in a specified area. But it is all text. The author, the title, the publisher, all just text, and not understood by the wiki.

As users interact with the wiki, just like working with word processors, a tremendous amount of "knowledge" is lost in the process of editing and updating the wiki, as well as creating the links, headers/sections, and sources used for the "page." The information is buried in the text blob, but not in a way that can be easily understood by the computer and acted on in real-time as the wiki processes the amassed (and obfuscated) knowledge is has stored in its database.

Some document management systems of the prior art have some sort of ties into workflow. But these ties are weak, either with two different systems, with the ability to reach across both systems (and user interfaces) to support a structured process, or, with some system, slightly more seamless, where, within one user interface, one can begin workflows, "attach" documents, and those documents are routed around within the "electronic folders" that logically move around with the workflow. As a user gets a task, the logical electronic folder is displayed so that they have access to any of the attached documents moving around with that workflow. While this may be better than mere documents or wikis, it is really just an improved work flow process that, again, is unintelligent as to the knowledge content of the documents in the system, the other workflows that may exist against that document, nor is there any capability to create workflows against parts of that document (one specific paragraph, for example).

Wikis support document creation with minimal workflow capabilities—typically just tagged states that require something that shows up on a page, or a special page that searches for those tags. The concept of the more structured log files, access control, sophisticated decision points, and other workflow concepts just don't exist. A workflow system can be used separately, and reference a page, but it is just a link. There is no understanding of what the wiki is or does, which places the burden on the user to understand what is being tracked and why. The workflow system still treats the wiki page as a "document" with no fine control over parts and pieces of that document that is outside of the workflow system.

Where production workflows are not very flexible in dynamic situations and business processes, they excel in structure, tracking, performance measures, and more. Wikis are dynamic, flexible, self-organizing, and able to handle completely ad-hoc situations with collaboration driving communications and further development of an activity. But ad-hoc workflows don't provide the level of tracking that production workflows provide, and they can become unwieldy—and outside influence that helps communications better than email and can provide more information back to the creator of the ad hoc, it comes at a cost in that the ad hoc workflow is disjointed from the work in that it is incumbent upon the user to make all necessary connections in a separate tool that the document creation environment (wiki or word processor), which adds significantly to the user's cognitive loading.

Case management is a hybrid workflow system that combines production with ad hoc workflows—tying some aspects of the production with the ability of the user to create as hoc (but related) workflows to address situations that the production workflow didn't or couldn't address. But the case management systems still live outside the context of the document creation applications. i.e., I start a "case" attach one or more "documents" to the case, it moves through a predefined production process, with the ability for the user to create other ad hoc workflows associated with the original case (which in reality, is again, a logical electronic folder of information). This still forces the user to go from editing applications to workflow tools and back again, and more importantly, its all about the document(s) in the case, and typically, some electronic form (eform) that is getting filled out as the case is being handled. The eform does provide some structured information that keeps track of pieces of status as the case is managed but is still disconnected from any form of document creation and management.

There are some domain-specific applications that have been built around very specific operations/activities that at least blend the interaction with the workflow tools into the document production process—but only in the interaction of the edit and workflow tools with some overall status information feeding from the built-in (and domain-specific, i.e. hard coded) workflow definitions. The document is still a document, and the underlying workflow doesn't understand anything within the document, only that it is tracking some sort of blob of content through its predefined workflows.

Some of the more advanced CMS systems have started to treat data that forms web sites as more discrete elements (sometimes called "nodes"), starting to allow for a more fine-grained approach to managing data, but they don't treat all of the data the same in that nodes are pieces of individual content, such as a page, poll, article, forum topic, or a blog entry, but comments are not stored as nodes but are a different data concept connected to nodes (how are they different than a blog entry that is linked to a specific other node?). There is no relationship between nodes—except through coding (through the visualization tools) specific uses of the information. These content management systems are very focused on websites, and not on document creation—and still treat the content of the nodes as a text (or data) blob. There are no data models to help define the node contents, the way the contents can be structured, nor interactions or relationships between nodes.

The issue with all of the above systems is in their treatment of the data. The emphasize is not on the structural aspects of the overall document, only that it "contains text," "is a blob," or contains other elements. They are focused on the creation of "data blobs," the history of the data blob, storing that data blob, with some ability to manage the tracking of that overall data blob, but they treat the data blob as a black box. Some would argue that the data blob itself has tags and other elements that help in the visualization, which is true, but the visualization/editing is a separate component, managed differently than the overall management of the data blob (i.e. the data blob management doesn't know about the display management, the structure, nor any aspects of fine-grained edit tracking). There is no regard for the content of that data blob, how it is made up, any concept of modeling the nature of that data blob (specifically, the unstructured nature of documents or other publishing constructs), the specific historical aspects of each piece of the data blob—with regard to artifacts within the data blob.

There had been work in the last few years dealing with the modeling of the contents of a document, used in the scientific and academic realms to try and process a document after it has been created to better characterize the document, how it is made, what sections exist, and what references are used—but not for the knowledge creation and management, but to help create a better search experience across those documents. It will associate documents together based on how they reference other documents (sourcing) or how they link to other resources. They can help a query limit the search to finding words in specific sections of the document, such as "Look for item X in the Materials section." This does add more power, but a key weakness here is that the processing of the document to fit the model isn't always accurate (if someone didn't format the document correctly for example), and a majority of the data about how each artifact within the document is completely lost when the document was created in current tools, so the characterization of the structure can, for the most part, be determined. However, questions like "what author touched this paragraph, and when," "what is the accuracy of this piece of text," and "how much do I trust the source that I used to generate this text" can't be answered. Worse, any human or Natural Language Processing engine that is trying to interpret the document has to treat everything in the document at the same level—meaning the characterization of the trust and accuracy has to be rolled up to the document level (and again, only if there is metadata that can be interpreted by the reader that is stored with the document), thus, any human, ML/AI interpretation will be inaccurate, as it might treat a well trusted source and analysis the same as a slightly trusted source with unsure analysis.

Formal document ontologies have been created for trying to process previously published documents to determine what their linkages are, potential relationships between other papers, etc. An example of one of these structure-determining ontologies is the Document Components Ontology (DoCO), which provides a general-purpose structured vocabulary of document elements to describe both structural and rhetorical document components using the Resource Description Framework (RDF). A document must follow a specific writing style and use appropriate titles, headers, figure markings, etc. in order for the ontology to post process the document and try and determine the general construction of the document (with all of the above-mentioned problems). Since DoCO and the utilities that have been written to use it are post production, any change in the source document creates a cascading impact over the search database used, since the post processing has to be rerun, and the database has to be purged of all of the previous processing so that the new results can be placed into the database.

This last point, the management of changing data, is one of the key challenges that creates many issues in the information and knowledge management and intelligence production spaces. That is why so many "Content Management," "Document Management," and "Knowledge Management" systems exist. But with few exceptions noted above, the granularity of the treatment of the documents is at the document level, and even the exceptions, which are designed more for websites, that allow for a slightly more fine-grained control over content still treats the more fine-grained elements as text blobs, with no built-in characterization capability over the content, and no directly integrated process automation control at a document artifact level.

Nothing found in the available public domain has discussed or articulated the use of a dynamically applied ontology, relationships between KUs, nor deeply integrated adaptive process management in the context of a data/info creation and management system such as an editor to drive appropriate structure and tracking in the document creation process, nor the logical application of a model over the top of KUs to dynamically formulate more familiar viewing constructs of knowledge such as a "document," nor the application of atomic knowledge units that can be addressed, tracked, and edited independently and manipulated for different purposes (even other than visualizations, for example pulled together for different types of machine learning or artificial intelligence concepts). Finally, nothing in the literature discusses characterization at this atomic knowledge unit level—such as supporting human and machine understood concepts such as subjective trust, subjective accuracy, key information characterization or grouping identifiers that identify the information in ways that allow for auto organization—such as summary, key point, incomplete information, and user defined information characterization and grouping elements—semantically defined.

What is needed in the art, therefore, is a system and/or method adapted to organize information at a more atomic level (i.e., basic units of knowledge—"Knowledge Units", or KUs") that adopts the use of a dynamically applied ontology, semantically understood relationships between KUs, and a deeply integrated adaptive process management in the context of an information creation and management system such as an editor to drive appropriate structure and tracking in the intelligence creation and production creation; is adapted to the logical application of a model over the top of KUs to dynamically formulate more familiar viewing constructs of knowledge such as a "document" that visualizes the semantic relationship between KUs; and is adapted to provide the application of atomic knowledge units that can be addressed, tracked, and edited independently and manipulated for different purposes (even other than visualizations, for example pulled together for different types of machine learning or artificial intelligence concepts). What is also needed in the art is a characterization of this atomic knowledge unit level—such as supporting human and machine understood concepts such as subjective trust, subjective accuracy, key information characterization or grouping identifiers that identify the information in ways that allow for auto organization, such as summary, key point, incomplete information, and user defined information characterization and grouping elements, semantically defined.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it provides a system and method adapted to organize information at a more atomic level that adopts the use of a dynamically applied ontology, relationships between KUs, and a deeply integrated adaptive process management in the context of a data/info creation and management system such as an editor to drive appropriate structure and tracking in the document creation process; is adapted to the logical application of a model over the top of KUs to dynamically formulate more familiar viewing constructs of knowledge such as a "document"; and is adapted to provide the application of atomic knowledge units that can be addressed, tracked, and edited independently and manipulated for different purposes. The system and method of embodiment of the invention are include adaptations for utilization of different types of machine learning or artificial intelligence concepts.

In an embodiment, the invention comprises a method for producing a desired representation of information using semantic object-based production of information and adaptive process management of such information, comprising: identifying characterizing attributes of a first plurality of knowledge units; storing, in an independent record in an knowledge store or database, information describing the attributes of each of said plurality of knowledge units; identifying one or more desired logical representations of said information targeted to a specific need, wherein said specific need is related to a second plurality of said first plurality of knowledge units; identifying, through a semantic object-based production process, which of said first plurality of knowledge units contain information related to said logical representation, forming a second plurality of knowledge units that are a subset of said first set of knowledge units; and displaying said second plurality of knowledge units in said one or more desired logical representations.

Embodiments of the invention may also comprise wherein the second plurality of knowledge units is saved as an independent record as a container knowledge unit, or CKU, having its own attribute data saved in said independent record in said knowledge store or database.

Embodiments of the invention may also comprise wherein the information describing each of the plurality of knowledge units is further defined as comprising provenance information, security information, information about sources, or workflow information about that knowledge unit, in any combination thereof Embodiments of the invention may also comprise wherein the container knowledge unit attribute data comprises container knowledge unit owner information for that container knowledge unit.

Embodiments of the invention may also comprise wherein the container knowledge unit attribute data comprises a workflow record of one or more of the knowledge units providing information to that container knowledge unit.

Embodiments of the invention may also further comprise the steps of a user of said one or more desired logical representations making a determination to update the information comprising at least one of said knowledge units, editing the information comprising the knowledge unit, and saving the knowledge unit to the knowledge store.

Embodiments of the invention may also further comprise the step of using adaptive process management to perform the steps of: recognizing that the information comprising the knowledge unit has been changed; searching the knowledge store to identify any CKUs that comprise information from the changed KU; and notifying the owner of each identified CKU that the KU has changed.

Embodiments of the invention may also further comprise a container grouping of knowledge units wherein each of the knowledge units is based on a model, forming a container knowledge unit. The model may be a pre-defined ontological model.

Embodiments of the invention may also further comprise the use of a dynamically applied ontology and an integrated adaptive process management in information creation, and further comprising a management system comprising one or more editors for driving appropriate structure and tracking in said step of displaying, and wherein said attributes are identified at an atomic level.

Embodiments of the invention may also further comprise wherein the container knowledge unit is based on a model.

Embodiments of the invention may also further comprise the step of dynamically applying an ontology for creating said desired representation, and further comprising a management system comprising an editor for defining the use of said ontology in creating said desired representation, and for editing said desired representation.

Embodiments of the invention may comprise a system for object-based production of information and adaptive process management of such information, comprising a computer or computer system, wherein said computer or computer system comprises a controller or processor in communication with a user interface and in communication with a computer readable medium comprising non-transitory computer readable and computer executable instructions for: identifying characterizing attributes of a first plurality of knowledge units; storing, in an independent record in a knowledge store or database, information describing the attributes of each of said plurality of knowledge units; identifying one or more desired logical representations of said information targeted to a specific need, wherein said specific need is related to a second plurality of said first plurality of knowledge units; identifying, through a semantic object-based production process, which of said first plurality of knowledge units contain information related to said logical representation, forming a second plurality of knowledge units that are a subset of said first set of knowledge units; displaying said second plurality of knowledge units in said one or more desired logical representations.

Embodiments of the invention may comprise wherein the second plurality of knowledge units is saved as an independent record as one or more container knowledge unit having its own attribute data saved in said independent record in said knowledge store or database.

Embodiments of the invention may comprise wherein the information describing each of said plurality of knowledge units is further defined as comprising at least one attribute selected from the group consisting of security information about each knowledge unit, provenance information about each knowledge unit, workflow information for each knowledge unit, and information about the sources that provided the information comprising each knowledge unit.

Embodiments of the invention may comprise a computer readable medium further comprising non-transitory computer readable and computer executable instructions for an adaptive process to perform the steps of: recognizing that the information comprising the knowledge unit has been changed; searching the knowledge store to identify any CKUs that comprise information from the changed KU; and notifying the owner of each identified CKU that the KU has changed.

Embodiments of the invention may comprise computer readable medium further comprising non-transitory computer readable and computer executable instructions for applying a dynamically applied ontology to said one or more container knowledge units.

Embodiments of the invention may comprise a computer readable medium that further comprises non-transitory computer readable and computer executable instructions for searching, retrieving, viewing, editing, transmitting and storing said knowledge units and container knowledge units in said knowledge store or data base, wherein said knowledge store or data base are stored as non-transitory computer readable data located in a physical memory in communication with a processor of the system.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 6 depicts an exemplary CKU, i.e., a desired presentation that is, in this example, an overall logical construct that joins various CKUs into what looks like a Table of Contents), of the invention.

DETAILED DESCRIPTION OF THE INVENTION

Figure 1:
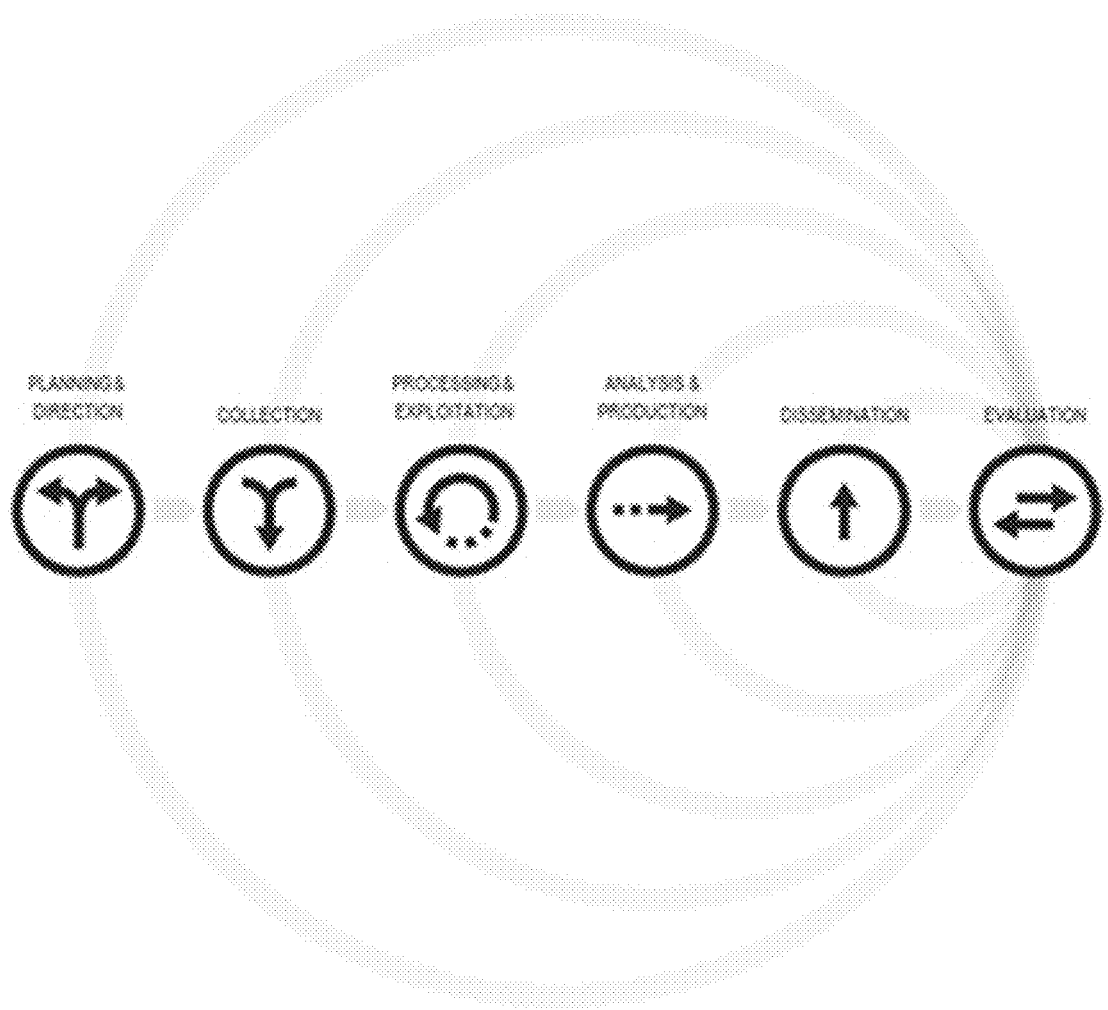
FIG. 1 depicts the Intelligence Cycle, the cyclic nature of the intelligence process.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As used herein, "Knowledge Unit" and "KU" include within their meanings a unit of information that comprises a knowledge artifact, at an atomic level, that is discretely tracked and maintained, regardless of whether it has been linked to, or identified with, a CKU. A KU may comprise a paragraph, a heading, a title, a description of a thing, etc. A particular KU may be edited in context with a CKU, such as viewing it as a paragraph in a document editor, while at the same time, it may be edited differently within a StoryMap editor, which would show up as a detail dialog when clicking on a picture that the paragraph describes, or, a user may go directly to a KU display, and edit the KU completely outside any other context or CKU. If the artifact is a paragraph, a user may search for a KU of type paragraph, and when the user selects one from the query, that use will only see that paragraph text, which the user may edit in a KU viewer/editor. The atomic KU is a self-contained piece of knowledge or fact—typically in as small of a chunk as possible to represent that piece of knowledge or fact. A KU may not contain a complete thought, although in embodiments, it might. This edit capability is a key element of the KU update process that may kick off APM process to identify CKUs making use of the KU, and updating those other CKUs so that a user of those CKUs is alerted to a change in the status or information related to a KU by an APM process of the invention. KUs may be associated with one or more CKUs. That is the power of the system—the mass reuse of the KUs into one or more CKUs—including dynamic CKUs—creates the ability for a user to "describe" a problem to the system, and the system dynamically building/constructing a CKU to present the information to the user to address that problem. A point of novelty of the method and system of the invention is that elements of knowledge, i.e. Knowledge Units, are assembled by the invention based on the semantic concepts into a coherent whole that may be represented by a semantically defined output. A KU is an atomic level item of information, for example, a paragraph, image, list, or table. KUs maybe semantically tagged and have meta data, provenance, and workflow attributes.

As used herein, "Container Knowledge Unit" and "CKU" include within their meaning a collection of KUs or CKUs that are semantically linked—through a semantic model or ontology. CKUs may also have meta data, provenance, and workflow attributes that are stored along with CKU in the Knowledge Store, saved in system memory. The semantic model (ontology) [or semantic information based on a query] of the invention may be used to dynamically assemble the KUs and other CKUs to form a desired grouping of the data. A CKU is not a copy of the original atomic KUs, but just an assembly of those KUs. Thus a CKU may comprise a plurality of KUs. Hence the dynamic aspect of CKUs—there is no updating the CKU. Instead, KUs are updated, added or removed through editing, and, the next time a CKU is requested it will dynamically re-assemble the latest KUs. A CKU is a logical view over the atomic KUs and other logically assembled CKUs.

The CKU can be used as a specific grouping of KUs and potentially other CKUs to arrange data in a logical manner based on the semantic model or ontology that can then be interacted with by means of a visualization, through the use of visual editing tools, or by interaction with AI, and/or ML algorithms.

As used herein, "Knowledge Store" includes within its meaning a data base of information that may contain Knowledge Units, Container Knowledge Units, the information comprising Knowledge Units, information about Knowledge units such as, for example, the date the Knowledge Unit was created, the author or authors, a measurement of the degree of confidence in the information contained in the Knowledge Units, and other information related to a Knowledge Unit or a plurality of Knowledge Units. The system and method of the invention may comprise one or more Knowledge Stores. The Knowledge Store may be realized in the form of non-transitory computer-readable files stored in computer readable media, such as electronic memory, that is in communication with a processor or computer of the invention that is operable to read the information stored in a Knowledge Store and to carry out the method steps of the invention.

As used herein, "semantic" includes within its meaning the "meaning", "context", and/or "intention" for all types of resources including data, documents, tools, devices, process, and people. This includes computing technologies and their interactions that may be used to extract or process computational content. The connection between content and the computer is made via semantics, which decorates content with appropriate tags and relationships based on semantic models or ontologies with the goal of converting it to machine processable descriptions.

As used herein, "output" includes within its meaning visual or hard copy display of a desired representation of KUs or CKUs which may be displayed on a visual display or plurality of displays, or may be printed, for display to a user or those associated with a user or for sharing with other systems, which may include Artificial Intelligence or Machine Learning ("AI/ML") functionality. It is not necessary that the output be displayed in real time, although it may be. The output may be saved in a memory of the system for later display. The output display make take any form of representation, and may be semantically defined. For example, and not by way of limitation, an output may be arranged to show temporal relationships between KUs or CKUs (e.g., a timeline); organizational relationships between KUs or CKUs (e.g. an organizational chart); geographical relationships between KUs or CKUs; familial relationships between KUs (e.g. a genealogical tree); and so on. An output may take the form of any desired representation: for example a report, a document, a table or any other arrangement of information desired by a user, as well as various data "shapes" that allow consumption by AI/ML processing algorithms. The output, or desired representation, may be displayed to the user on a display or printer of the system for observation by the user. Such display maybe be made available to any number of persons or entities associated with the user. The output desired representation may be saved in an memory of the system for future retrieval and display to the user or any number of user associates. Such later display is not limited by geographic location, display modality, or time. [more here about remote display] In a next optional step, the user or the system itself may determine that the information comprising the KU needs to be updated in order to bring it current.

As used herein, "Object Based Production" and "OBP" include within their meaning a method that creates an "object" for people, places, and things and then uses that object as a "bucket" to store all information and intelligence produced about those people, places, and things. The object may be a Knowledge Unit or a Container Knowledge Unit. A object may be either a KU or CKU since people, places, and things have attached reports, images, references, metadata, that are semantically linked to such person, place, or thing, and the object might have descriptive notes and text that describe some aspect of the object—which could be made up of multiple KUs. The object becomes the single point of convergence for all information and intelligence produced about a topic of interest to decision makers. In the system and method of the invention, the objects are the base individual elements of knowledge that are the launching point to discover information and intelligence.

As used herein, "Adaptive Process Management" and "APM" include within their meaning a method for intelligently identifying relationships between KUs, CKUs, and other objects, and update CKUs or workflow as needed. For example, when an instance of a defined flow is started, that flow is related to certain KUs or CKUs, depending on the context of workflow activation. This means that any object in the OBP can have one or more associated workflows, or even sub-components within a CKU, so it is possible to have active workflows against a specific KU, such as a paragraph KU for review, or an image KU to do some markups on it. This is a deep-level of granularity that the prior art workflow, document management, content management applications cannot support because they treat documents as blobs to be moved around; i.e., they are not intelligent methods. In contrast, APM is qualified structure driven off a model that assembles discrete KUs and other CKUs into a cohesive CKU that allows a user to interact and track at that KU level, with the ability to roll up all those sub-CKU activities into an overall CKU-level output, such as a report. (For example, a Report CKU may have three images in workflow for markups, two sections under development (driven by workflow), and six individual paragraphs that are currently in requests for assistance workflows). Adaptive Process Management, or APM, is adaptive in that it takes the best of production, ad hoc, and case-based management, and brings it directly into the knowledge management system—a deep integration, allowing workflows of any type to be created against any piece of granular knowledge—and to allow that knowledge to "understand" that it has workflow against it, and allows any other object to know when they have workflows assigned. Also, instead of going in and out of workflow tools, the workflow operations are in the context of the visualization—meaning that the user does not need to leave their editing/viewing environment to perform workflow functions, and, since the information is now semantically tagged, the viewing context is understood by the workflow, so that as a workflow is started, the workflow understands that they are viewing the KU in a specific way, that they are editing a specific KU, and it knows the initiator of the workflow—without any manual interaction by the user. The workflows are not hard-coded as in other systems, meaning that as production workflows are created, they can be created without understanding how the data is being used/visualized by the user—it understands the knowledge unit itself and can ensure that all tracking, control, relationships, and access is managed correctly within the knowledge management system.

As used herein, "ontology" includes within its meaning a formal representation language for describing a model.

As used herein, "meta data" includes within its meaning information about the object with which it is stored, for example a KU or CKU. Meta data may provide author, time and date of creation, file size, security (e.g. read/create/edit privileges) and other information about the object with which it is stored. Meta data may be a stored attribute of a KU or CKU.

As used herein, "provenance" information includes within its meaning chronology of ownership, change or edit chronology, custody chronology or location chronology of the object or record with which it is stored. Provenance information may be a stored attribute of a KU or CKU.

As used herein, "workflow" information includes within its meaning chronology records of instances in which a record or object such as a KU or CKU, have been used in other records, functions or systems, such as, for example, used in CKUs. Workflow information may be a stored attribute of a KU or CKU. As an example, a search of the Knowledge Store for any CKUs comprising a particular version of a KU or CKU that has recently been edited will reveal those CKUs that comprise that particular version of a KU or CKU.

Intelligence Production

Referring now to FIG. 1, intelligence production follows a process known as the Intelligence Cycle. The Intelligence Cycle is a highly dynamic, continuous, and usually never-ending process of developing raw information into finished intelligence for use by a decision maker such as business executive management, policymakers, military commanders, and other users engaged in decision making. The six steps are: 1) Planning and Direction, where decision makers provide the intelligence requirements which inform the intelligence planning activities, 2) Collection, where intelligence systems and sensors amass the raw data required to produce the finished product, 3) Processing and Exploitation, where the raw data is converted into a comprehensible format that is usable for further analysis and production of the finished product, 4) Analysis and Production, where analysts integrate, evaluate, analyze, and prepare the processed information for inclusion in the finished product, 5) Dissemination, where the finished product is delivered to the user that requested it and to others as applicable, and 6) Evaluation, where feedback is continuously acquired for each step of the Intelligence Cycle as well as the Cycle as a whole to evaluate the effectiveness of the process. While there are numerous opinions as to how accurately the Intelligence Cycle reflects actual intelligence production, it does provide a frame of reference for understanding the nature of the invention.

Figure 2:
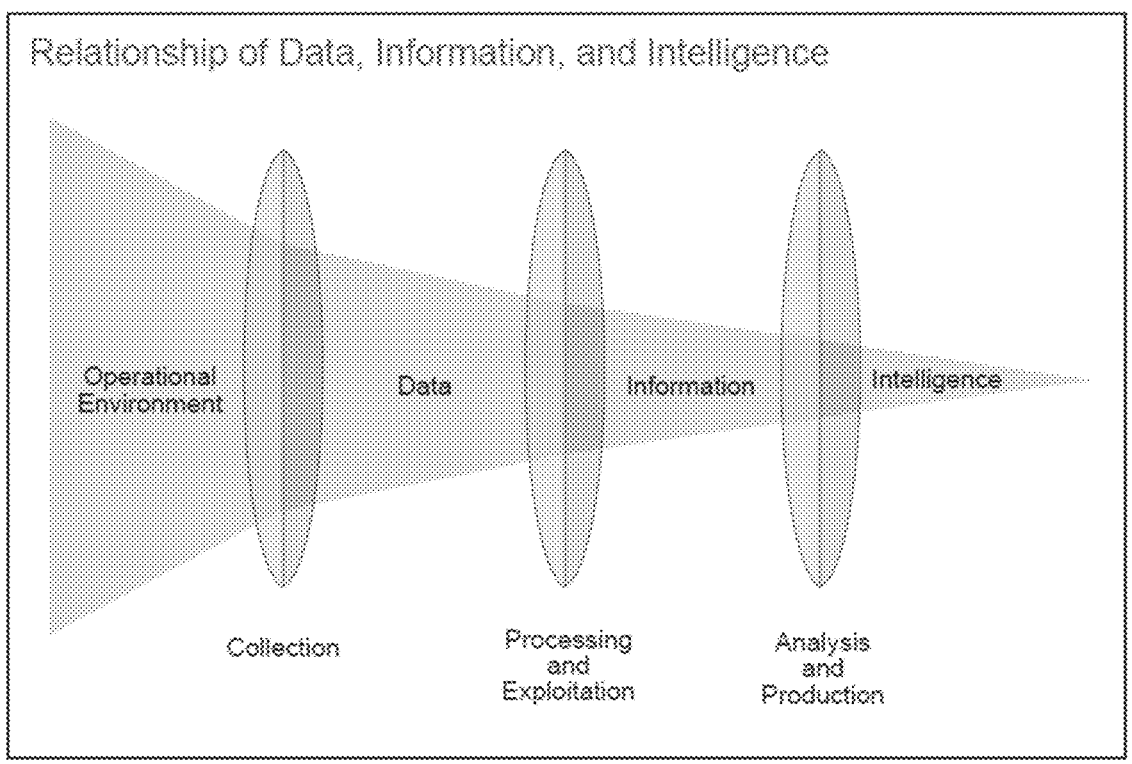
FIG. 2 depicts moving from data to intelligence—as data flows through the process, it is further refined and presented in ways that allow for a situational understanding of the operational environment.

Referring now to FIG. 2 a different perspective on the flow of data is provided, starting from raw data to finished intelligence. Each stage of this information refinement process has challenges, but we will focus on challenges in the Analysis and Production stage. Moving from data to intelligence—as data flows through the process, it is further refined and presented in ways that allow for a situational understanding of the operational environment.

It is during the Analysis and Production stage that analysts use various analytical techniques and processes to identify the right tactical problems and analyze threats to discern their doctrine, tactics, organization, equipment, objectives, and capabilities ultimately leading to ascertaining threat intentions and actions. Once they have performed their analysis, they produce their results.

Problems in Intelligence Production. In all but a few cases, the current work process consists of creating Microsoft Word documents, sending them via e-mail, and receiving coordination and review comments in "track changes" on electronic files, or in writing on hardcopy printouts, and incorporating those comments into a final product. Or, more loosely stated by one blogger: "collect traffic, write paper, publish." This is a manual and tedious process that, according to the literature, is associated with many issues that impact the performance and quality of the intelligence production.

While there are numerous issues listed in the literature, three general issues will be addressed in more detail below: 1) data characterization, 2) requirements clarity and coordination (products not relevant or aligned to the user's decision-making needs), and 3) lack of collaboration (stovepiped production).

Data Characterization. Data characterization is a way of marking data to understand the content, accuracy, source, and completeness of data. It is critical to the successful analysis of intelligence information. Without a comprehensive and systematic documentation of all relevant data, an analyst (or machine) will be incapable of making accurate intelligence assessments. The problem is significant when it comes to the use of automated tools and techniques, as those tools essentially treat all data equally.

Data characterization starts at the point of data production—or example, at the sensor. Of course, there are multiple areas of data production, even from other analysts. Any time data is touched by any system (or human), it must be tracked appropriately (also called provenance). Any system used to support data used by an analyst should support full provenance. This requires significant metadata about the data to include information uncertainty attributes, pedigree (information source(s)), processing attributes (analysis/fusion algorithms), quality attributes, data accuracy estimates, and estimates of the analyst's analysis as they process the data.

The estimates of analysis are critical to help the decision maker (and Machine Learning/Artificial Intelligence) understand what is known with confidence versus what are untested assumptions. In order for the decision maker to determine how to apply the intelligence to the objectives and operations, he must know whether the intelligence is "fact" or "assumption," which analysis method was used to develop the intelligence estimate, and the confidence level the analyst placed on his conclusions (which is a combination of the confidence of the sources used and the analysis performed).

There are generally accepted terms for expressing a level of confidence in intelligence or knowledge:

TABLE 1

List of terms to express confidence in analytic judgements.

| Low | Moderate | High |
| --- | --- | --- |
| Uncorroborated information from good or marginal sources | Partially corroborated information from good sources | Well-corroborated information from proven sources |
| Many assumptions | Several assumptions | Minimal assumptions |
| Mostly weak logical | Mix of strong and | Strong logical |

TABLE 1-continued

List of terms to express confidence in analytic judgements.

| inferences, minimal methods application Glaring intelligence gaps | weak inferences and methods Minimum intelligence gaps exist | inferences and methods No or minor intelligence gaps exist |
|---|---|---|
| Terms/Expressions | Terms/Expressions | Terms/Expressions |
| Possible Could, may, might Cannot judge, unclear | Likely, unlikely Probable, improbable Anticipate, appear | Will, will not Almost certainly, remote Highly likely, highly unlikely Expected, assert, affirm |

Even the tools used by the analysts do not provide or enforce an interface where the analyst can express confidence in their analytic judgements—especially in a way that is machine understandable. Again, this means that anybody looking at the information (human/machine) will have to consider all of the data to be at the same level of confidence and accuracy.

The lack of provenance also hurts the production process due to less information provided to address the data looping problem of duplicate data. While data processing services in more advanced knowledge base systems exist to help de-dup data, having provenance data can significantly improve the accuracy of these services. The provenance data can help in the detection of duplicate or near duplicate information coming from different sources or from the same source at different times.

There are several challenges for the analyst in trying to meet the goal of writing for maximum utility when producing an intelligence product for a decision maker based on gathered fact of various confidence levels. First, there is may be diverse group of users desiring the analyst's intelligence products. How does the analyst write to these multiple users with differing expectations and needs? He or she can attempt to address all users by creating a general product, but such a product may not provide information that supports specific decision makers. Or they could create a product written very specifically for an individual, but this product will most likely be irrelevant to many other decision makers, and may soon be out of date as the knowledge supporting the product ages and become inaccurate over time. Maybe a standard report is not even desired. Maybe users just need to know where the key leaders are located (a map-based display would work for this), but someone else needs the details on the communication system the leaders are using and where this infrastructure is (a storymap may be a better information delivery medium). How does the analyst produce the information, make it relevant for various users, but not manually create multiple versions of the same report?

To prevent wasted analysis efforts, analysts must know what their users want and what kind of decisions they need to make. This clarification of the requirements would allow the analysts to focus on areas of research that best support those decisions, rather than spending time trying to provide information for a wide spectrum of intelligence that may not be used. In addition to requirements clarity, coordination with the users, who can provide input into the production process as the intelligence is being created, is also necessary. However, there is friction in this relationship.

A balance can be struck if the tools supporting the process allowed for commenting by the users of that intelligence (e.g., decision makers), while the analyst follows industry practices that stress that the analytic assessments must not be distorted by, nor shaped for, advocacy of a particular audience, agenda, or policy viewpoint. Analytic judgments must not be influenced by force of preference for a particular policy. Since each and every request and statement would be available to all reviewing the intelligence, the user of the intelligence would be policed by the community if he tries to improperly sway the intelligence outcome.

Figure 3:
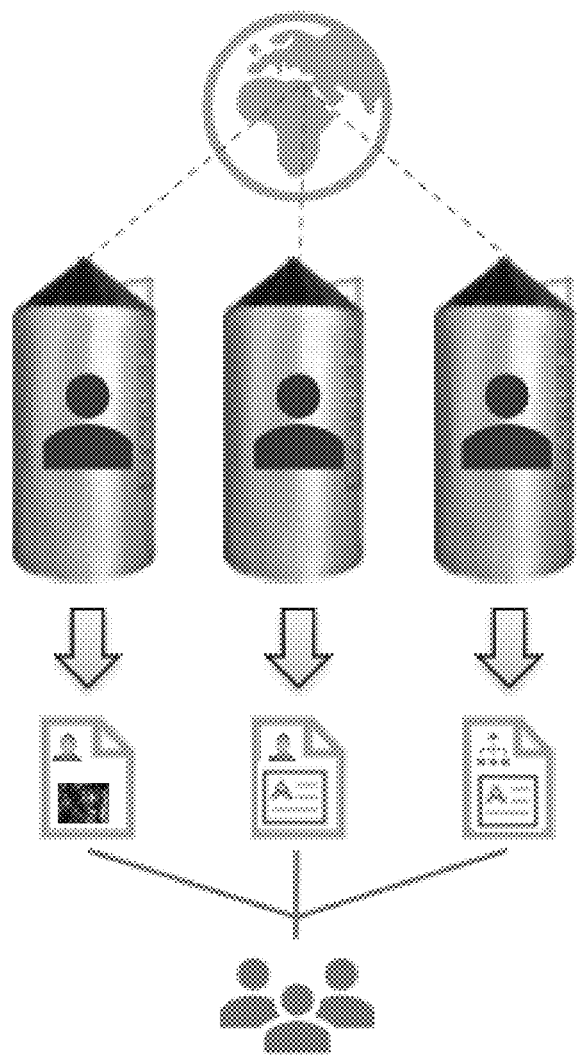
FIG. 3 depicts prior art stove-piped intelligence processing, in which stovepipe generates separate documents, or reports, with little or no interaction or collaboration among the stove-piped communities.

Referring to FIG. 3, stove-piped intelligence production is depicted. In most cases, each type of intelligence (for example, signals intelligence, imagery intelligence, human intelligence, etc.) has specialists that are focused specifically on one of those types. Each intelligence organization also tends to focus on a specialty, with a primary focus on the "intelligence product." Even though multiple forms of technology have been applied in an effort to create a more robust and sharable intelligence production process, intelligence products have remained remarkably unchanged: they are primarily static, branded, and stove-piped. FIG. 3 demonstrates this activity, where several intelligence organizations are tracking an area of interest, working independently, constructing their FINTEL. The side effect is that each organization's report may contain duplicate data, different data, or even different results, requiring the user of that data to try and determine what each analyst was thinking when he made his analysis.

This prevents the economy of scale that would be available if efforts were coordinated, each analyst taking on specific focus areas, with other analysts checking their work and providing input in the form of comments, suggestions, and even competing theories as to what the information means.

Intelligence Product Mentality. It will be difficult to overcome that issues previously mentioned if the IC continues to have the mentality of producing a "finished product" at the end of the intelligence process. Having this physical product forces specific workflows and thought processes in the analysis production, which is rigid, time consuming, and has less of a focus on analysis.

In a service mentality, the focus is on the recipient who is the consumer of intelligence services and specifically on how best to meet the customer's needs. It is not about the author or the producing component; it is about the recipient. It is about helping that customer understand an issue. It is about being timely, relevant, expert, and corporate in our approaches to providing service, intelligence analysis. Success is measured not by the number of units produced, but by how well the product addresses and answers the specific concerns of an identified and targeted audience."

Even using the word "products" was itself confining because it shaped the thinking of intelligence producers into focusing on the outcome of analysis as a static commodity—creating processes and mindsets that create barriers to efficient intelligence information distribution. The report further suggests that the IC "should adopt flexible and varied forms of delivering intelligence support that can address the differing objectives of America's multiple national security missions." To accomplish this, the knowledge itself must move out of the current forms of monolithic, static documents, and into something that allows for "flexible and varied forms of delivery."

Turning the classical publishing paradigm (gather, write, QA, publish, repeat) into an always-published paradigm (edit and expose, refine continuously) has significant benefits based on the mathematical models. These models suggest that both publishing methods produce the same final quality, but the always-published paradigm does it faster. The models (and empirical results) show that the classical publishing paradigm slows the accumulation of information value.

Some sources consider web technologies as providing an opportunity to rethinking monolithic documents. They specifically called out Wikis as a better platform for intelligence creation. Wikis present intelligence findings as an evolving, "living" document that allows immediate changes as new evidence/concepts/ideas emerge. It allows experts in multiple areas to collaborate on the findings—providing a way to break the stove-piped approach to intelligence creation. It also allows users with different perspectives to comment on, or even challenge the views presented in the findings. These different perspectives enhance the overall value of the information.

Figure 4:
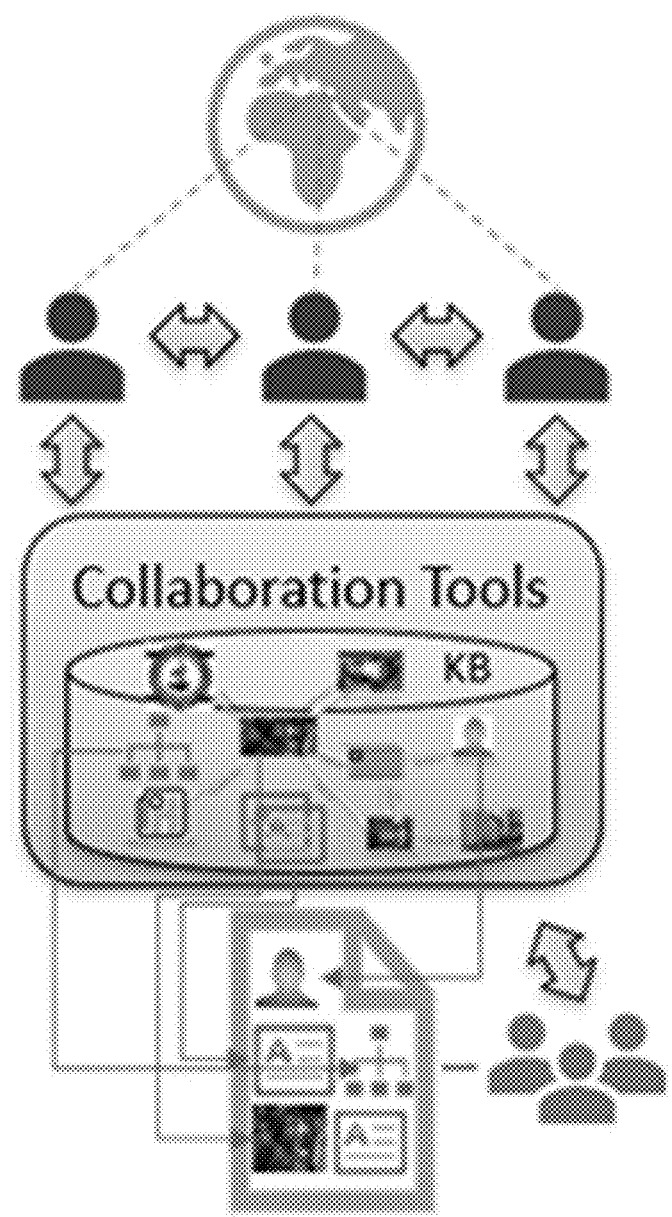
FIG. 4 depicts the concept of always-published paradigm in intelligence processing of the method and system of the invention, that, unlike prior art systems, supports a highly collaborative environment that can even support dissenting user views. The method and system of the invention allows the decision maker (which is, in some cases, the user) to have all the facts and information to make the best informed decision possible.

FIG. 4 demonstrates the always-published paradigm. This paradigm, applied to intelligence production, provides a more cohesive view of the intelligence, as multiple intelligence agencies would work together to build and enrich the knowledge. Each organization observes an event, reaches into their data sources, performs the analysis, and starts updating knowledge artifacts using collaboration tools, including the wiki. Automated notification to a community of interest informs other interested analysts about the new, on-going analysis. Interested users of the analysis will also get informed. The other analysts can provide input and other points of view (with appropriate sourcing and analysis), while the user can provide guidance on what they need to support future decisions based on the analysis (including suggesting priorities of the analysis work). Many different views of the knowledge artifacts can be assembled such as a traditional document view, a map-based view, a story-map view, etc., providing the users the most usable format possible to support their decision making.

However, in those same sources, while wikis provided real value in the intelligence analysis, they had their own set of issues that prevented them from helping the analysts move away from the finished product mentality. For a significant overview of problems with wikis and collaboration software in general. While the wiki received high marks in collaboration and organization, it hasn't fulfilled the "living" document concept. In fact, one of the better-known intelligence wikis (Intellipedia), while successful as a source of information, is not considered finished intelligence. Some of the more prevalent complaints of the wikis being used were lack of workflow and content management. We argue that there is a larger, systemic problem: the ability to store unstructured information in a way that makes it reusable, and more machine friendly. Current generation wikis still store their information as blobs of text. Instead of a file like a word processor, a wiki stores the blob in the database. You can do full text searches, but the unit of knowledge is still the "page," which in most cases is equivalent to a document.

Figure 5:
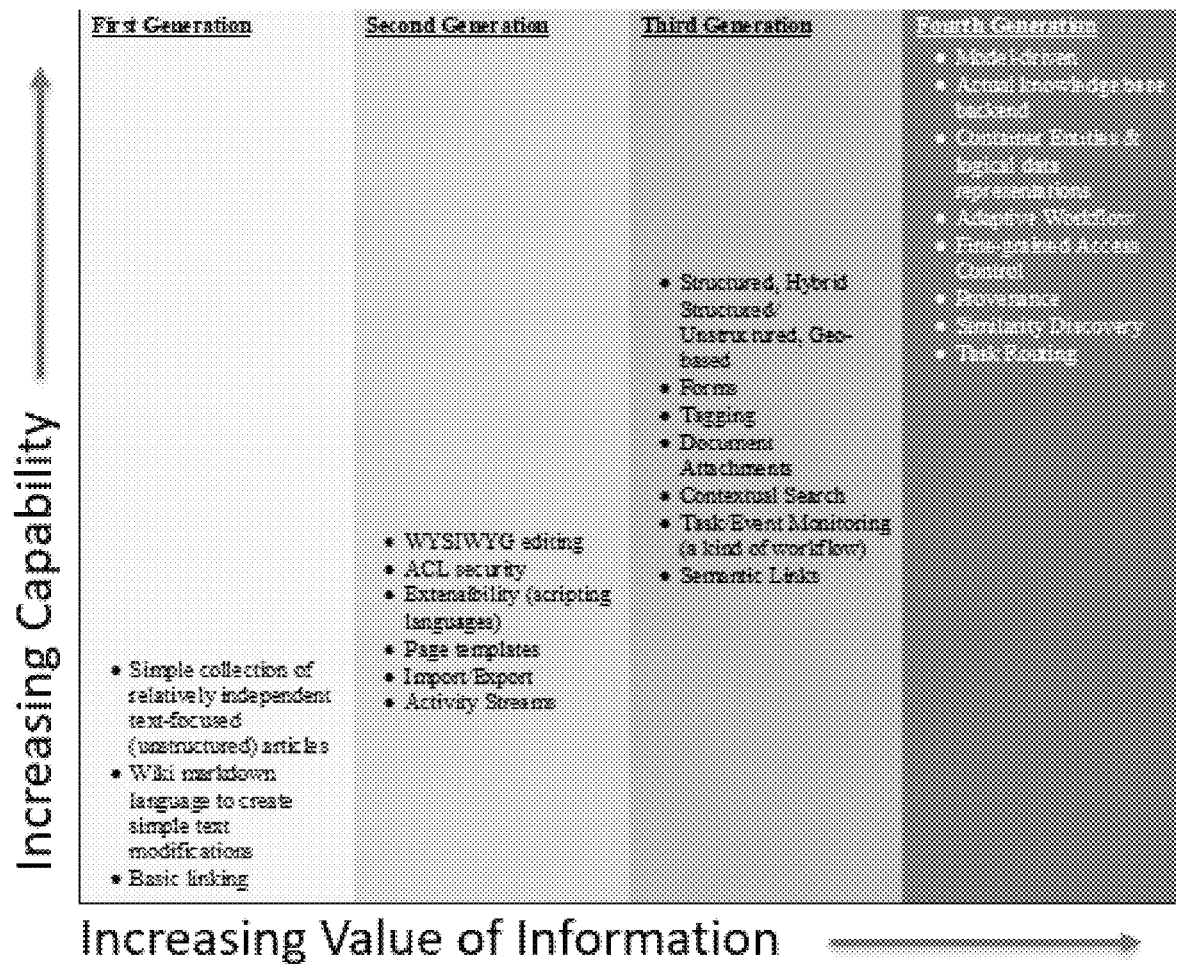
FIG. 5 depicts the concept that the next generation wikis of the invention increase the value of information through increased capabilities in knowledge management

As mentioned previously, there are several studies on the benefits and weaknesses of wikis in the intelligence community. Some of the expressed weaknesses are associated with limitations of the technologies themselves. FIG. 5 depicts the increasing functionality with each generation of the wiki, with the newer generation wikis starting to address these limitations.

First-generation wikis were simple collections of relatively independent unstructured text-focused articles. They used what is known as a markdown language to create simple text modifications such as bold, italics, headers, and lists. They supported basic linking between the pages.

Second-generation wikis followed to address issues associated with the first-generation wiki (markdown language was not friendly, no security on the wiki, no ability to extend what was shown in the wiki). Second-generation wikis addressed these issues by adding access control lists and user signons to secure the wikis (and to make sure that edits to the page were associated with an author so that there was less of a chance for a user to "deface" the wiki). They added what you see is what you get (WYSIWYG) editing capabilities, so that new users need not learn the markdown language. Page templates were provided to allow creation of new pages in a specific style/format to save time. Scripting languages were provided to override the base functions of the wiki to add new features. Import and export was added to move information between wikis. Finally, the activity stream was introduced so that users could "watch" what was happening in the wiki to determine if content of interest had been added.

Third-generation wikis started stepping out of the "text only" based wikis. They supported both structured and unstructured information, (with structured including Geospatial, Temporal, and general database information), and some even supported hybrid structured/unstructured implementations. Forms were added for the structured side to make it easy to enter and validate information. Tagging was introduced to allow for binning of the information (improved discovery), while document attachments allowed the wiki to take on document management capabilities. Some third-generation wikis supported a semantic framework for the links between the pages, allowing the computer to start understanding what the links meant. Contextual search was added to help improve the precision of the query results. To support information management, task and event monitoring were added as a semi-manual form of workflow.

Third-generation wikis are in wide usage today. As mentioned previously, some of the more prevalent complaints of the wikis being used were lack of workflow and content management. Some of the third-generation wikis are adding next-generation capabilities. For example, model-driven wikis can be found that allow arbitrary data models to represent their structured data. Some use actual knowledge-based backends, but only for the structured data, or the links within unstructured data. There are other wikis with more fine-grained access control capabilities.

The nature of the wiki (based on the convergent design principle) is supposed to ensure duplication is removed from a wiki through the discovery of the duplication and replacing the duplication text with a source for the relevant content. However, that doesn't always work well in a distributed wiki environment, so some wikis have de-duplication capabilities built in to search for and suggest potential duplication within the wiki.

Another next-generation feature is the ability for the wiki to perform intelligent task routing (task in this case is simply a notification to a user of the system that something created would benefit from their review). The automation would solicit contributions from members that have the knowledge and ability and/or interest in new content. Even simple algorithms have large effects. Algorithms based only on the community's needs are less likely to interest members than algorithms that consider a person's knowledge and ability.

Shared Electronic Folders for Collaborative Analysis. This enhancement would allow analysts to share information gathered during the course of multiple, wide ranging, but potentially related analysis projects. Meta data tagged to each file, standardized file formats, and a common ontology, and dynamic updating and notification would greatly facilitate collaboration of analysts and reduce redundant searches and analyses. This would be based on an Electronic Skills Inventory that would also allow analysts to identify other intelligence analysts in different organizations who have the skills, experience, and clearances needed to assist in the analysis task.

FIG. 5 has three other capabilities that we believe create the concept of living intelligence within the next-generation wiki, those being Provenance, Adaptive Workflow, and Container Entities with logical data representations. As pointed out previously, current products are lacking in the capability to characterize the data and intelligence, a weakness that has significant impacts in how the data is used to make decisions. Entity management systems exist that track entity-level provenance, but we have not found any wikis making use of this technology in the open literature. Also mentioned is the weakness of wikis to support anything but the simplest task routing.

The last item is how we propose to solve the larger, systemic problem—the ability to store unstructured information in a way that makes it reusable and more machine friendly through container entities and logical data representations. This is a technology base that reimagines the notion of "document" (the finished product). Instead of the monolithic, single file that is prevalent today, we see it as a logical makeup of individual artifacts (paragraphs, images, tables, lists, etc.) that are each treated as separate, editable components, with their own history that are logically assembled on-the-fly into a "document," if that is desired. This same data can also be assembled into a map representation, a timeline, a storymap display, etc.—all with the same underlying data, but represented in the form that best serves the decision maker accessing the data.

Technology Foundations. Three technologies exist today that focus on foundational capabilities for knowledge management. This includes Object-based Production (OBP), Adaptive Process Management (APM), and Entity Management software. Together, the three technologies complement each other, and provide a capability to address the missing capabilities listed above.

Object Based Production (OBP). Object-based production is a concept being implemented as a whole-of-community initiative that fundamentally changes the way the IC organizes information and intelligence. Reduced to its simplest terms, OBP creates a conceptual "object" for people, places, and things and then uses that object as a "bucket" to store all information and intelligence produced about those people, places, and things. The object becomes the single point of convergence for all information and intelligence produced about a topic of interest to intelligence professionals. By extension, the objects also become the launching point to discover information and intelligence. Hence, OBP is not a tool or a technology, but a deliberate way of doing business.

OBP aims to remedy the missed-data possibility (not knowing where all data about a specific object resides) and increase information integration across the IC and DOD by creating a common landing zone for data that crosses organizational and functional boundaries. Furthermore, this business model introduces analytic efficiency; it reduces the amount of time analysts spend organizing, structuring, and discovering information and intelligence across the enterprise. By extension, OBP can afford analysts more time for higher orders of analysis while reducing the time it takes to understand how new data will relate to existing knowledge. A central premise of OBP is that when information is organized, its usefulness increases.

Adaptive Process Management (APM). APM provides a distributed and collaborative workflow solution through a combination of production and collaborative workflow types—providing visibility, traceability, and historical continuity across them—supporting sophisticated tracking processes that are unattainable with most production workflow solutions that require every condition to be pre-coded into the process, thus creating a maintenance nightmare. APM supports the concept of "knowledge workers"—users who learn as they perform their jobs and determine new concepts and information during their research. These users require the ability to initiate Requests for Information and/or Collaboration with other analysts based on their discovery, on-the-fly while they are working in an intelligence production workflow process. Yet management must maintain the visibility into the active work (tasking), and the auditing needs to correctly associate with the original report production process to help provide appropriate metrics, such as average time to create a specific type of analysis work.

APM is adaptive since it is object-based, allowing production or ad-hoc workflows to be established against any object within the system. Any other workflow associated with an object is immediately visible to anybody viewing that object, which provides a workflow awareness within the context of the working environment.

Entity Management. A key capability of the APM system is the semantically enabled entity management system (EMS) that fuses entity data for object assessments and enables reasoning to relate entities to each other or to specified situations. The EMS can infuse domain knowledge into data to generate intelligence about the entities and uncover complex relationships and patterns across the data. The EMS is seamlessly integrated into APM for better search, navigation, and management of workflow artifacts. EMS also provides deep-level provenance, supporting data characterization at the object level and allowing the export of data with all of the provenance attached to support cross-system sharing, as well as correctly characterized data for processing by artificial intelligence and machine learning systems.

Semantic OBP. Semantic OBP is a powerful concept, but mainly focused on finished intelligence reports, where the reports are created in a different tool, and usually tracked at the full report level. Thus, the usability of the information is limited, and by creating a "published" document, the pedigree and provenance is lost. There is limited or no ability for the down-stream users of that technology to influence or guide the report production process so that the intelligence material is more useful to the way they need to use the information for their decision-making processes.

Semantic OBP takes the OBP concept and applies it to the actual creation of the intelligence reports, making the information tracked within OBP more fine-grained. The structure of the OBP backend technology is represented as a highly linked semantic graph structure (knowledge store) instead of a table-based database structure, providing far more computer understood meaning to the data and making the data more human friendly in the way users interact with the information. The capability takes the concept of an intelligence report and creates a logical representation of it within the graph structure, treating the report artifacts and individual objects, with full provenance and pedigree continuously tracked.

This representation has many advantages. Each paragraph, section, image, table, etc., within the report is searchable, reusable, and available for any analytic process that runs against the graph store. Not only can each artifact be re-used, each re-use inherits automatic updates from the original author. For example, if a table is created to keep a tally of all equipment for a deployed system and that table is re-used across multiple reports, any change to the original table will automatically be reflected in every report referencing the equipment table. Not only is the data auto updated, but the capability, using the provenance chain of the object in the graph store, allows the user to see the full history of the table. While current wikis track changes to a page, the changes are at the page level, with the computer having no understanding of which paragraphs have been changed by which user (they use difference algorithms to simply show how the text in the page text blob is different from previous versions of the text blob).

Provenance at the object level enables us to answer questions such as, "What paragraphs have used sources by author John Doe in the last three weeks?" This is a difficult, if not impossible, query in current generation wikis, as they have no computer-understood concepts of "sourcing" or that there is an author associated with a source. They would simply do a full text query for the name and could only tell you if that name was used in a page of data that could contain dozens if not hundreds of paragraphs. Worse, that name on that page may not even be a resource, but a description of that person or another person on that page. Even if we simplify this and ask what paragraphs were changed by user John Doe, again, the current generation wikis would only return a page link as a result, and in most cases this data is separate from the full-text query capability provided by current generation wikis, and thus not searchable.

Further, current wikis allow comments at the bottom of a page, but don't provide any other form of user interaction with the data on the page, except for direct editing on the page, which is not always the desired approach. Using the OBP construct, each report "page" (which could be a full report, or a section or part of a larger report) supports the ability to have comments. The comments are actually full OBP-based information constructs themselves, supporting their own object-based construction and management with rich editing and sourcing. The report page also supports collaborative "chat-like" capabilities that are more communicative in nature. The comments and chat are available with any object within the system, be it at the full report level, a section in the report, or even a report artifact such as a paragraph or table—all associated with those objects, and able to be viewed outside the logical construct they are currently viewed in.

Semantic OBP supports editing capabilities with tracking at the artifact level. This allows sourcing requirements an security rules and best practices to be enforced since object-level artifacts support separate tracking of security classification markings; even sources are their own objects that are linked to report artifacts, providing the far richer query capability mentioned previously. Current-generation wikis have no way to enforce these directives since they are basically dealing with a large text blob rather than highly managed, discrete objects that can be represented to look like a report. Semantic OBP also provides the multi-level security capabilities, since any logical construct in the wiki is simply a query of the object store, and the object store completely enforces access-control-level security. Artifacts that are above the user's current credential level will not be shipped from the server to the client; the assembled final representation will just collapse to fill the vacant spaces left by the artifacts that don't meet the security requirements, leaving a visible report that matches the security level of the logged-in user.

How does the Semantic OBP fundamentally change intelligence production in the IC? Current intelligence report dissemination is managed by creating Acrobat or PowerPoint "documents," which are static representations of intelligence as of the time of publication and, therefore, atrophy at the same moment. Current wikis used by the IC such as Intellipedia are not considered "finished" intelligence by the various three-letter agencies, due to the lack of quality standard enforcement, structure, and fine-level pedigree and provenance tracking they feel is necessary, yet published documents have lost all of that information except at the full document level.

Here again, the capability of the system to enforce ICDs within the editing environment helps resolve the "not-finished-intelligence" issue, since sourcing is validated, provenance deeply tracks the source of, and changes to, the information. The enforced ICD mechanism makes it easier, in fact, for the user to follow the directives. The improved environment allows for better computer understanding in terms of user interaction with the data being created. Three-letter agencies will know that any quality directives they create can be enforced by this next-generation wiki. Further, by not actually "publishing" a physical report, but instead making the report dynamically discoverable in various IC systems, the report will always reflect the latest information, making it far more relevant to a user's needs. The various collaboration elements also allow the users to influence the report creation process early in the cycle, providing input to the producer that helps him prioritize the information going into the report. A user closer to the "edge" can look at a piece of intelligence and realize that a report he just gained from the units close to the fight might impact that intelligence. In this case, the user can use the comment capability, link the report with the information that impacts the intelligence, and create a description of the concern or finding within the comment. When the comment is saved, the system's integrated APM automatically traces back, potentially through multiple levels of "reports which are just logical representations of the intelligence represented as individual objects) and notifies the responsible producer of the new data that might impact his intelligence analysis. In some cases, that producer may have the authority to make the change directly in the report, which "auto" publishes, since the report is always in a published state. In other cases, the producer may be an owner of a larger intelligence product and may assign the data to an analyst to study to determine the impact. The resulting changes can be QA'ed by the appropriate levels of the organization, approved, and made immediately available.

An additional benefit of the method and system of the invention is that if someone views the output, they can view not only the output (for example, in the form of a report), but they can also see any comments about an artifact or section within the report, along with the commenter's credentials and the source material supporting the comment. If the analysis has not been updated to incorporate the new data, the user can decide if he needs to consider that new data, or make use of the currently approved version, or, if the situation is not time sensitive, he can wait for the analysis to complete, and then make his determination. Reports are always published, always available with the latest known information, always being updated with information from the users of the intelligence, as well as information discovered through new intelligence, collection activity, and other intelligence operations. This feature of the invention is not possible with the prior art "finished product" focused intelligence production paradigms, and thus represents yet further improvement over the state of the art.

Allowing dynamic updates to keep the intelligence reports (and more importantly, specific pieces of intelligence that are then highly reused in higher level reports) "always up to date" in effect removes the information cut-off date from the intelligence reports. The wiki-like environment allows for improved collaboration across the IC. Multiple eyes-on improves analytical confidence levels in terms of the completeness of the research and intelligence development. Finally, this next-generation wiki is fully aligned with broader IC direction through its enhanced support of OBP constructs and methodology support.

The invention comprises a novel, unique capability that considers the concept of documents in an entirely different manner than systems of the prior art. For this capability, we look at atomic, fine-grained pieces of information (a knowledge unit), tracked at the lowest construction level possible. Typically, this is at the document artifact level (paragraph, source, header, table, list, image, etc.—any construct that is able to convey a specific knowledge fact or basic concept that makes up a knowledge unit ("KU")) but the capability can also track down to individual sentences or items within a list as well (in some cases, a KU is just a sentence). The initial implementation was driven off DoD intelligence product production requirements, which requires security markings (unclassified, confidential, secret, top secret, etc.) specified at the artifact level in unstructured text, and at the attribute level for structured information. Thus, the smallest unit for a security marking was the paragraph in our initial implementation of the capability, but the concept does support down to the smallest logical unit of document construction, such as a sentence to make up a KU, a cell that makes up a table, or a row that makes up a list.

With this base premise for the management of information, there is no specific concept of a "document" within the system. It tracks KUs, and then logically assembles the KUs dynamically into some desired representation of those KUs, typically a "document." But in this capability, those same KUs can also be dynamically represented on a map (if they have spatial attributes), on a timeline (if they have temporal attributes), on various visualizations (if they have associated grouping attributes such as numeric or fixed number of tagged elements), and even hybrid structures like a storymap—which places points on a map with appropriate textual information in other areas on that same view that explain what is shown on the map. Since the data is not viewed as a blob, it now becomes highly reusable as far as how it can be displayed—and since these displays are just logical constructs, new logical visualizations can be added to the system, and applied to already existing KUs, which will dynamically create the resultant visualization based on the atomic KUs applied to the new logical representation model.

This means that unlike an edit, QA, publish, repeat cycle, we have an "always published" state, where anytime a KU changes, the representations of that KU in context with other KUs are all dynamically updated. There is no "syncing" to a separate search engine, no purge/update database requirements, everything is always up-to-date.

This last concept has been desired for many years in the intelligence community (IC)—and was coined "living intelligence" by NGA. But they had no technology that would support this concept—as their tools were the ones previous mentioned, with all of the associated problems, and thus, the closest they got was to use Wikis and update them, but those wikis were never considered "finished intelligence" because the wiki did not support the fine-grained tracking of the information to the level necessary to gain the trust in the IC. While they know that a user may have made a change, there was no quick or easy way of determining what was changed and how without manually going to each individual document and doing a manual "compare this version" due to the wiki treating the complete page as one data blob of "something." With the new capability, that can know exactly what was touched, when it was touched, how it was touched, and where other logical representations (documents and other representations) have been impacted by the change.

By tracking information at the KU level, and treating ALL information as KUs completely new forms of visualizations and data knowledge constructs can be created. Further, since activity is tracked at the KU level, and the KUs are now highly reusable, these KUs will be associated with different uses that are not currently possible—for example, today, the Intelligence, Surveillance, Reconnaissance (ISR) systems are quite separate from the planning and missing management systems due to the nature of the data being tracked and managed (an ISR "document" doesn't fit very well into an operations plan (OPLAN) that follows a very different visual "flow" of representing the information). As a KU, the ISR side of the house will have created a KU (AKA Object, AKA Entity). Note that there is a powerful concept of a "container KU" which is made up of several KUs based on a model, and thus, the above-mentioned visualizations, when represented as a document via a model are in reality container KUs ("CKU"). When the OPLAN will be interacting, targeting, influencing, etc. that KU, the KUs can be directly used within the OPLAN with a different logical representation that makes better sense for the OPLAN decision maker—even though it is the same underlying data. The OPLAN is itself a CKU, and a relationship is formed between a specific instance of an OPLAN and the KU. Relationships between the KUs are another powerful concept that adds reasoning capabilities to help enforce data governance and modeling requirements, but also allow new forms of data to be created based on the reasoning rules. This capability alone makes the information being tracked far more useful and reusable, but we now gain an order of magnitude capability enhancement through the relationships—since we now have the capability to understand how the KUs are used within various CKUs and the normally independent "documents" (such as an ISR report and an OPLAN) are now related via those relationships between the underlying KUs. In the previous paper, the example of knowing that the ISR group is performing some intelligence collection on a person (an entity in the system—typically a simple CKU) that the OPLAN is running a mission to meet with that person. The OPLAN users will have immediate visibility into any other CKUs that make use of a shared KU. It can't be stressed how important this one capability is—with no extra operations on the underlying data, knowledge of how the data is being used is an inherent construct—requiring no extra data manipulation, no extra rows creating this understanding, no other code/applications to access how the data is used.

Merging process management concepts within the core KUs, and more specifically, an adaptive process management (APM) capability that allows for both production (pre-defined) process flows, computer generated process flows, and human generated "ad-hoc" process flows—all related to each other, with consistent and complete logging as though all were created initially with the original pre-defined process flow as found in many process management engines.

In embodiments of the system and method of the invention, all data within the system is treated/managed the same—and everything is a KU, and a CKU is made up of a logical ordering of multiple KUs. Same with APM, as a new process instance is created (a process instance represents a previously defined step-by-step process flow for humans and machines to control the data flow through the system, between systems, and between humans and systems), a KU is created for that instance, and a direct relation is created to either one of the KUs or a CKU within the system that the APM is working to automate, perform an action on, or otherwise create an interaction with or between the C/KU and anything else. This capability alone provides the ability to interact and track data at unprecedented levels of granularity. In fact, each KU, and the attributes about the KU can themselves instantiate ready-made process flows based on activities against those KUs—such as an edit operation starting up an email notification list, or a deep level validation against an ML/AI algorithm, or create new KUs based on rulesets/reasoning actions based on KU creation/edits/deletes. More importantly, a new level of status and tracking can occur at the C/KU level, providing new and more dynamic ways of visualizing and dealing with knowledge management activities within the capability. This is also important because this allows the APM to be completely independent, yet able to be related, to any potential usage of the C/KUs, especially in context of interacting with the C/KUs through a user interface that now has access to a high degree of data understanding, characterization, and active activities on those C/KUs. For an example, refer to FIG. 6.

Figure 6:
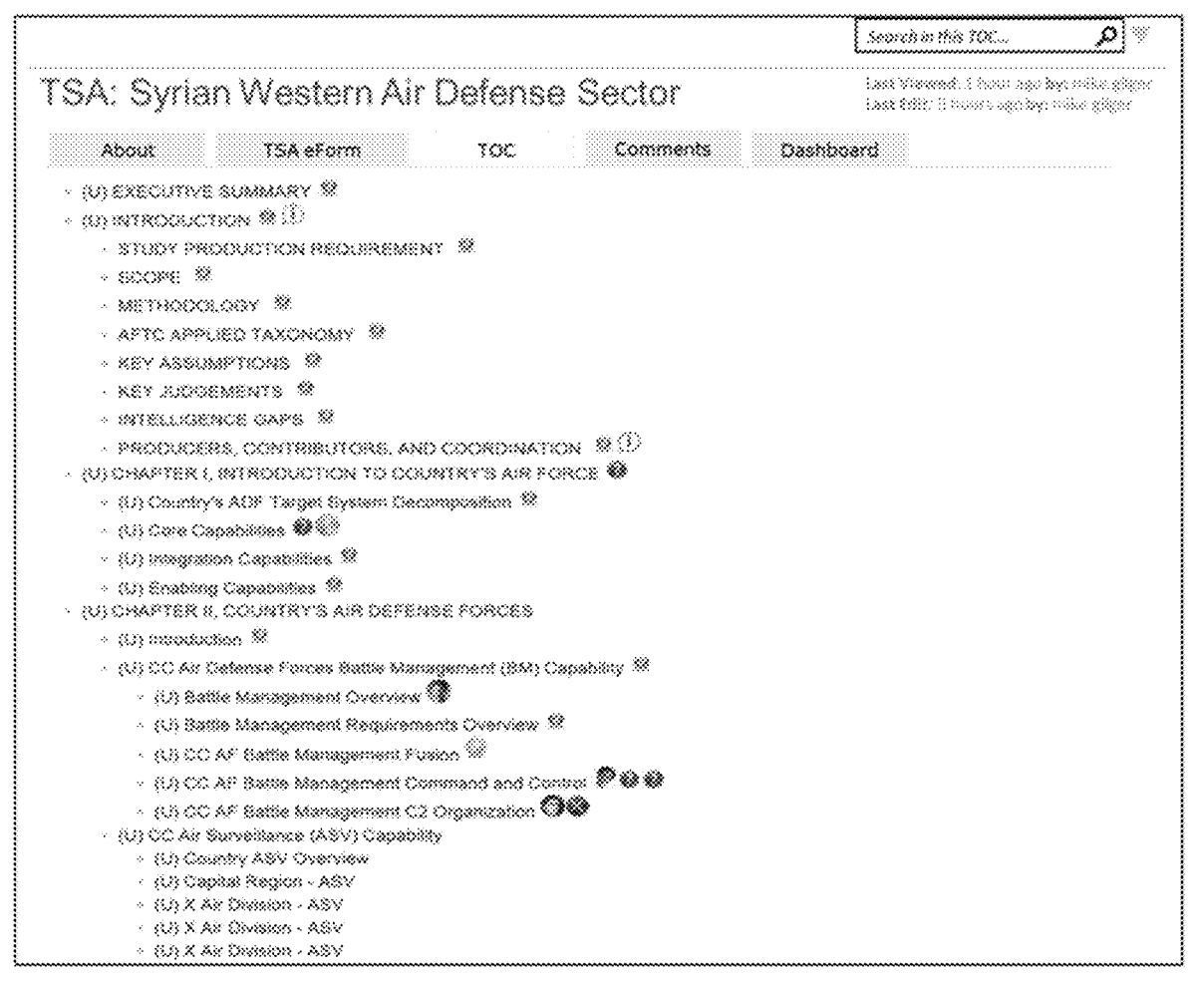

FIG. 6 depicts an exemplary CKU (an overall logical construct that joins various CKUs into what looks like a Table of Contents). Of note, each of the items within the list are themselves CKUs that are then made up of the atomic KUs that are also logically formed to represent the content of that information. The visual icons give status indications of that specific CKU (and if this was within the CKU, and KUs were represented such as paragraphs, the status would be at that level as well)—since the data is directly associated with the displayed CKU. Other systems would require extra queries and checks within external workflow services to see if something related, but in this case, it wouldn't, since those systems track workflow at the "document" level, which is what this CKU itself logically represents. At this fine-grained level, the capability allows an introspection of any type of active APM process associated at the CKU and KU level, and it allows different visual indications for the type of activity it is—again, provided more status information at a more granular level within what would normally be the work processor or wiki page—without going outside of the Knowledge Store that makes up the capability. This figure also depicts adaptive process management—the CKU is made up in this image of multiple "section" CKUs, and there are active workflows against all of those that have icon decorators which give live indications of activities going on against those CKUs. Not shown in the figure, but a user could begin a new workflow processes right from this interface—not having to go to a separate application to start the workflow and then attach the document to it, as required by systems of the prior art.

Further, through the semantic associations, as APM processes are created, they also are KUs, which can be semantically tagged, and thus, the model that defines the TOC layout above can also query the knowledge base for any "related" APM processes, and present those to the user as something that can be started from the C/KU they are currently hovering over, or have otherwise selected. This now provides a dynamic GUI (unlike case management systems which could have pre-canned workflows) based on models that are also themselves dynamically maintained within the system. This allows the user to interact with process automation in context of the logical working space they are in. Instead of a separate workflow application that they have to switch to and associate (at the "document" or "data blob" level), the semantic structure (model) that defines how to logically assemble the visual display—and interaction with the C/KUs also provides a context for the machine to understand how all of this relates together, allowing the user deep-level process instance control and visual understanding (through APM) while within the working environment of the item they are editing/managing/working on.

Generation of KUs. Information comprising the KU may be gathered via any of a numerous set of sources, including human intelligence; signal intelligence; sensor data; image data; documents; observations of persons related to the subject of the KU; political affiliations records; background check records; analog or digital video recordings, or both; analog or digital audio recordings, or both; financial records; and so on. Virtually any recording, document, record or observation may be gathered, parsed, and the resulting KUs input into the system of the invention using the various structures for entering information into the system of the invention described herein, in any combination. This KU information may be entered into the system of the invention using a user interface such as communication port for receiving data such a serial or parallel data interface, a portable readable memory device such as a solid state memory device or hard disk that inserted into, or connected to, a communication port in communication with a processor of the invention, a keyboard, a touchscreen, a microphone, a camera, or any other input/output device known in the electronic arts. KUs may be saved and stored in a database of the system, or in a database in communication with the system of the invention. The database may be a Knowledge Store. The KU may be retrieved by any user for use in creating any output, as when, for example a user is planning a mission. Multiple KUs may be associated with a single CKU. A single KU may be associated with multiple CKUs.

Figure 7:
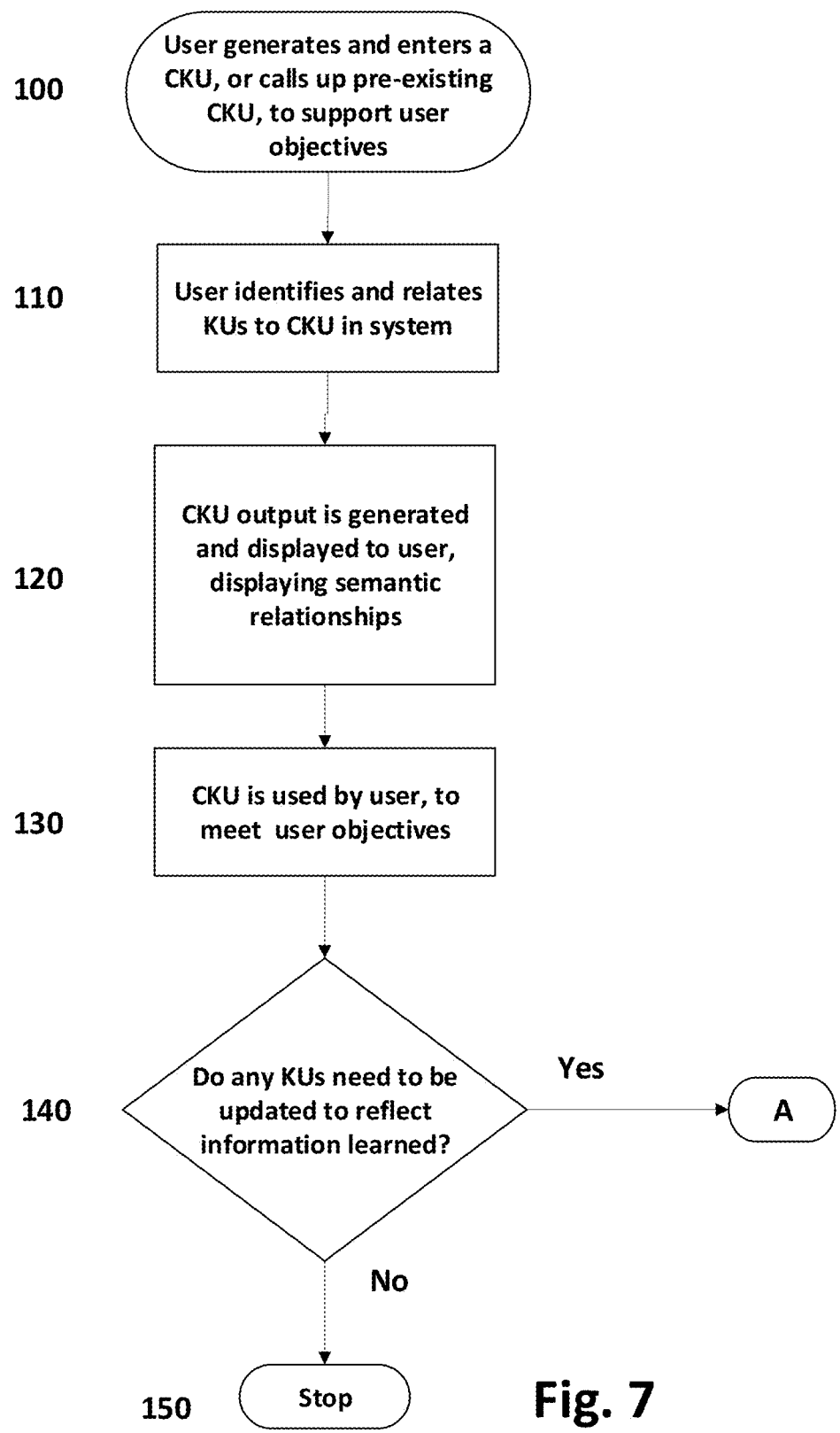
FIG. 7 depicts an exemplary flow chart of a basic process for the use of Knowledge Units identified with a Container Knowledge Unit of the invention by a user for the creation of an output in support of a mission.

Referring now to FIG. 7, a basic flow diagram for an exemplary embodiment of the invention is depicted, in which one or more Knowledge Units are utilized to form an output. In an initial step 100, based on user goals or objectives, a user may enter a CKU describing a desired output into the system, or may recall a stored CKU from system memory. The user goals or objectives may be any user-defined goal or objective such as, for example and not by way of limitation, to publish a report on a person, place or thing. Such a report may have, for example, business significance if, again for example, it concerns a person who is a potential business client. KUs related to that person may comprise, for example, a KU concerning demographics of the person, a KU concerning finances of the person, a KU containing information about current activities of the person, a KU containing information about current activities of the person, etc. It may be desired by the user to establish an output CKU, such as a report, that provides a summary of the demographic and financial information related to the person, but also provides a timeline of their activities. In a next step 110, KUs are identified (again, the KUs may be entered by the user, or retrieved by the user from system memory) by the user, and these KUs are related to the CKU by entering this information in to the system. It should be noted that steps 100 and 100 may be reversed in order, and do not necessarily follow the order depicted in the figure. In a next step 120, the users desired output is generated. Since the KUs are semantically tagged as they were created, sections were marked that include sources, key data, summary, etc. Thus, the method of the invention searches the Knowledge Store and dynamically assembles a CKU that is this new, user defined report. Yet it the resulting CKY is based on active, up-to-date KUs that already exist in the system. The CKU did not exist before the users request. The output CKU may take any desired representation, depending on the user goals, objectives and profile specified by the user. The KUs may be semantically displayed relative to one another as desired, or as deemed appropriate by the system of the invention, such as, for example, depicting KUs in a geographical relationship, a storyboard, an organizational relationship, a familial relationship, a timeline and so on. The user then makes use of the CKU to meet user objectives 130, and any information learned in the carrying out of the mission as to whether a KU should be updated may be assessed 140. If no KU needs to be updated, the process flow may cease 150. If, however, a KU does need to be updated, process flow may continue along path B.

Figure 8:
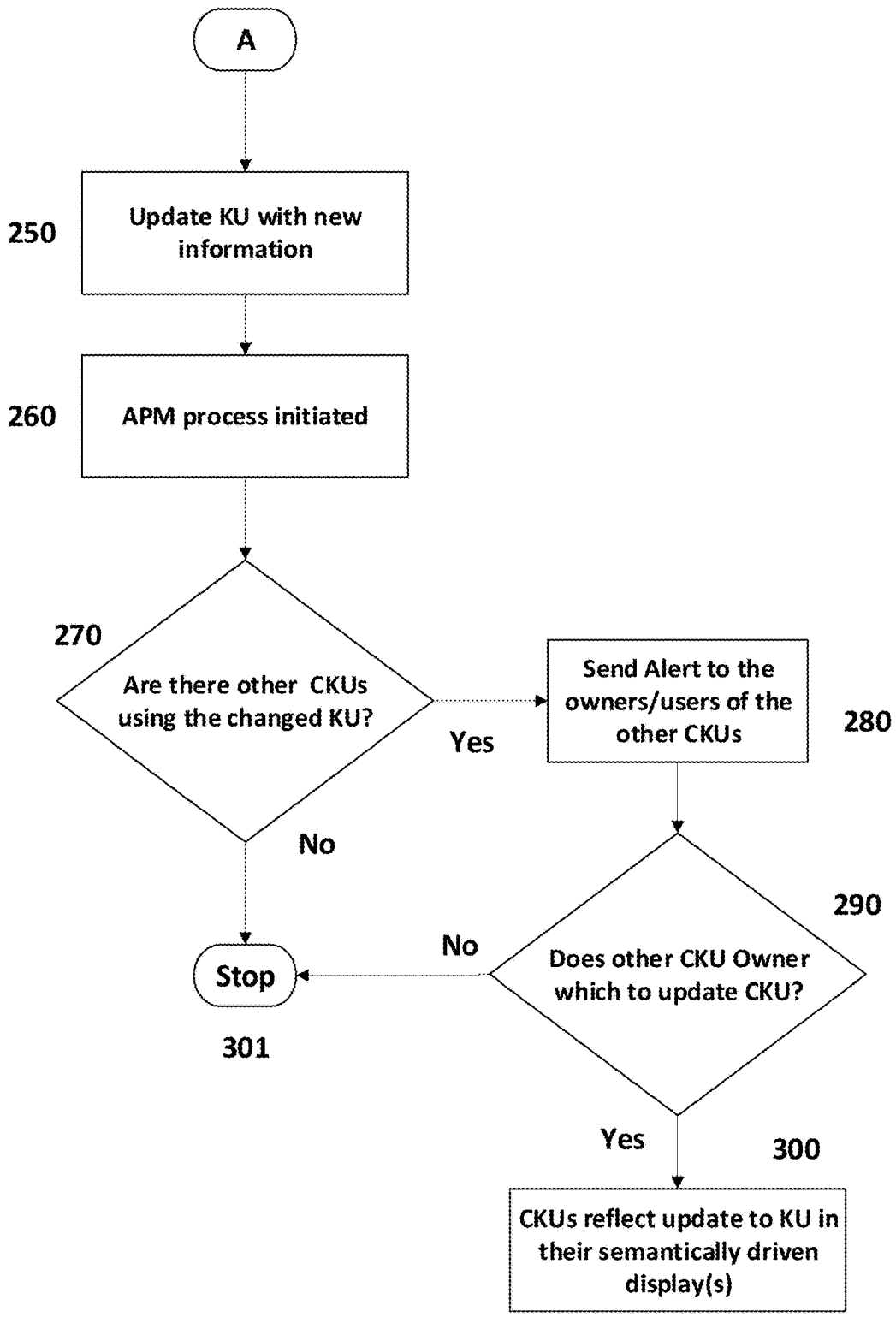
FIG. 8 depicts a flow chart of an exemplary use of a Knowledge Unit of the invention, in which a user is alerted that other users have used that same Knowledge Unit, allowing the user to coordinate tasks or mission activities with such other units in order to eliminate negative outcomes from different units acting with cross purposes in relate to an asset, informant, item or other element.

Referring now to FIG. 8, a flow diagram for an exemplary embodiment of the invention is depicted, in which a first user change to a KU is automatically identified as relating to a CKU in process by a second user, and in which the method and system of the invention work to automatically push the updated CKU information to the second user, without the need for the second user to request a refresh or re-synch of their CKU. In an initial step A, a first user has identified the need to update a KU with newly learned information. The KU is updated 250 and saved back into the Knowledge Store. The APM method and system of the invention recognizes that the state of the KU has changed, and automatically begins a process of identifying any current CKUs which are making use of the changed KU 270. If any such CKUs are identified, the owners or users of those CKUs are notified 280. The owners of the other CKUs may then decide 290 whether to update the semantically-defined displays of their CKUs, 300. If no other CKUs are identified by the APM, or if the other CKU owners or users decide not to up update the other CKUs, the process may stop 301.

Figure 9:
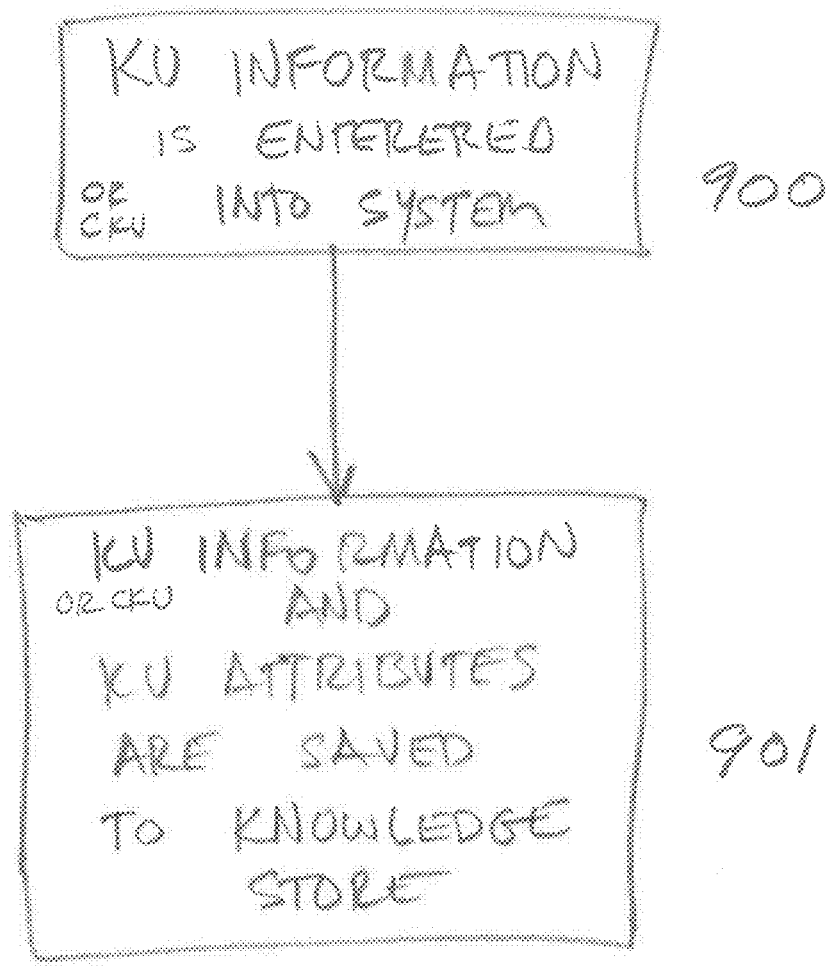
FIG. 9 depicts a flow chart of a KU and/or CKU editing function of the invention. The information comprising a KU or CKU, or their attribute data, may edited or generated by a user 900 and saved the Knowledge Store 901 for later retrieval and use by users of the system

FIG. 9 depicts a flow chart of a KU and/or CKU editing function of the invention. The information comprising a KU or CKU, or their attribute data, may edited or generated by a user 900 and saved the Knowledge Store 901, which is stored on a memory y of the system, for later retrieval and use by users of the system.

Figure 10:
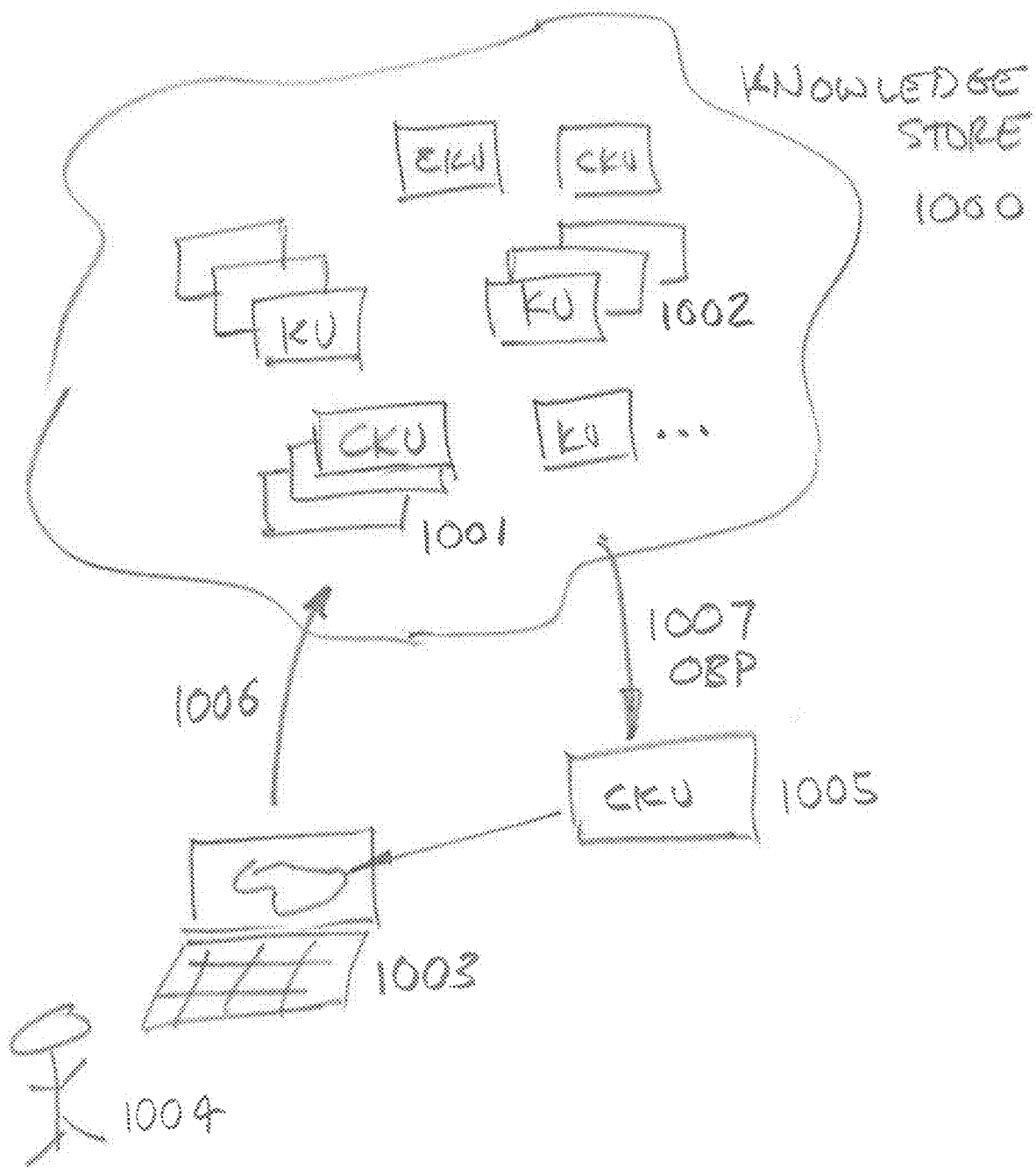
FIG. 10 depicts a system representation of a process flow of but one embodiment of a user of the semantic OBP process of the system.

FIG. 10 depicts a system representation of a process flow of but one embodiment of a user of the semantic OBP process of the system. A user 1004 may recall from memory, or may enter new, a CKU description 1006 by using the editor function of the system and a user interface 1003 which may be, for example, a computer having a visual display and a keyboard, and, optionally, a computer mouse. Knowledge Store 1000 may have a plurality of KUs 1002 and CKUs 1001 stored thereon. User 1004 enters the CKU description into the system using the editing function of the system 1006, and requests the OBP to identify KUs and/or CKUs stored in the system that are related to the description of the user CKU 1006. The OBP process of the invention queries the KUs and CKUs stored in the Knowledge Store residing in a memory of the system, semantically identifies related KUs and CKUs and, from these semantically identified KUs and CKUs, builds a CKU of related information as requested by the user 1004 which is displayed in one or more desired representations on a visual display of the system such as the display forming a part of use interface 1003, or the one or more desired representations may be printed or sent to another system.

Figure 11:
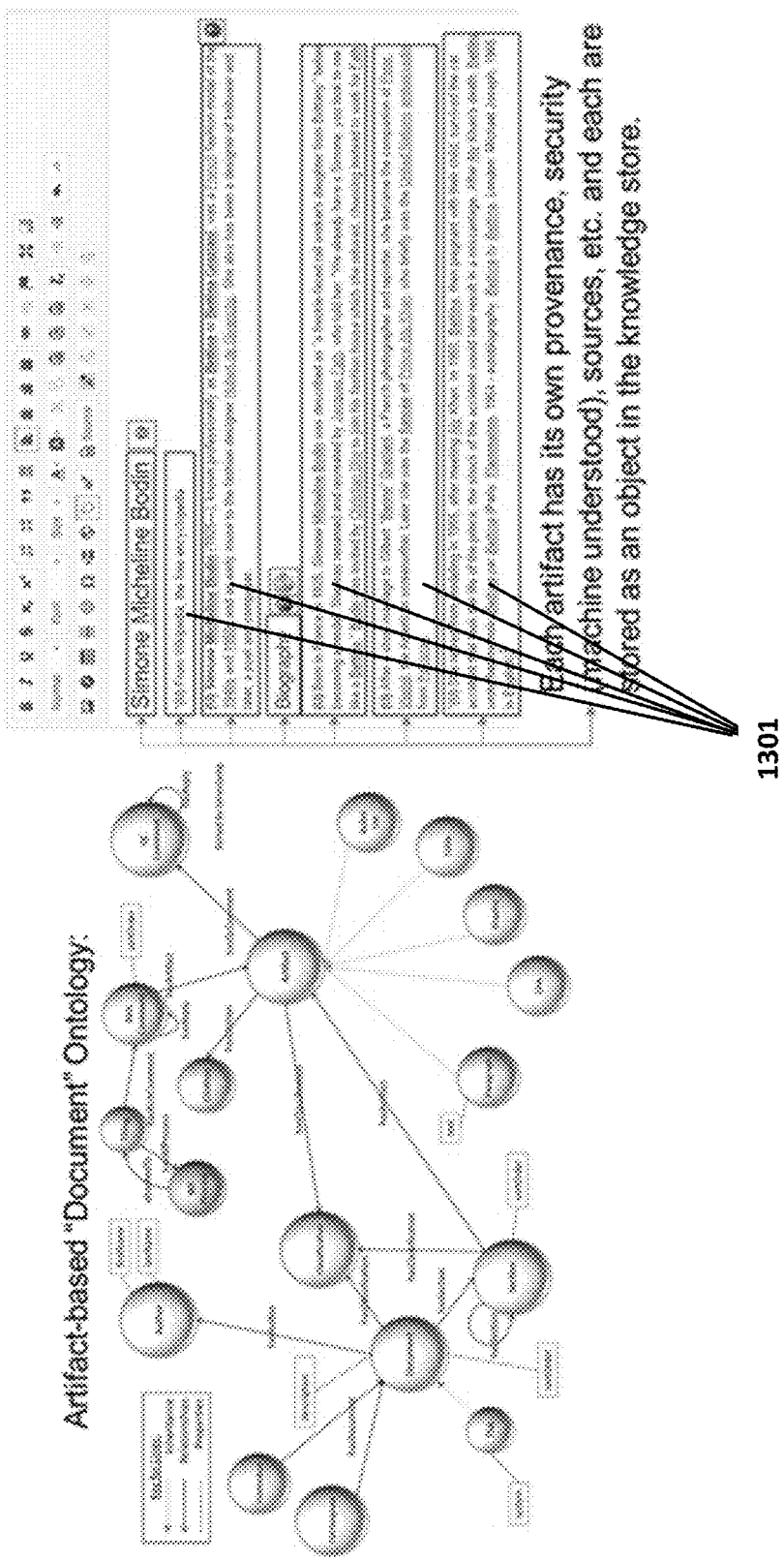
FIG. 11 depicts one of many potential logical knowledge representations as shown on the left side of the figure (in this exemplary case, a "document" with titles, headers, paragraphs, sources, etc.), with an editor that is dynamically interacting with the knowledge store to represent C/KUs (in this case, the red outlined items are all individual KUs, with the overall structure of these KUs being the CKU), with (as shown) each artifact having its own provenance, security, sources, as well as workflow instances associated to the KU and/or CKU level.

Referring now to FIG. 11, one of many potential logical knowledge representations is shown on the left (in this case, a "document" with titles, headers, paragraphs, sources, etc.), with an editor that is dynamically interacting with the Knowledge Store to represent CKUs and KUs (in this case, the red outlined items 1301 are all individual KUs, with the overall structure of these KUs being the CKU), with (as shown) each artifact having its own provenance, security, sources, as well as workflow instances associated to the KU and/or CKU level (shown both in model and in logical document representation in FIG. 11).

Figure 12:
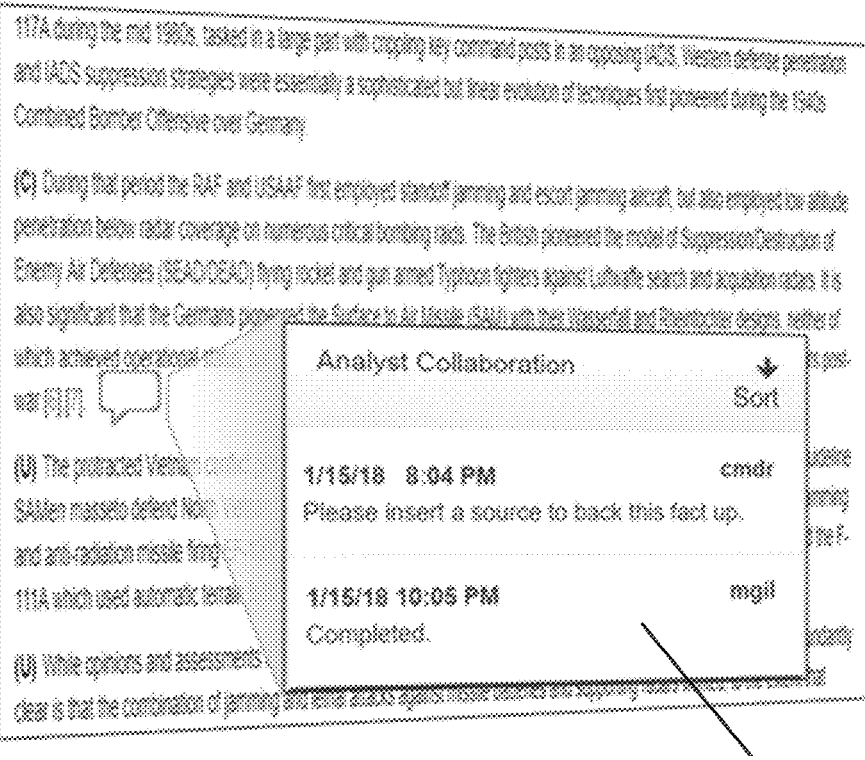
FIG. 12 depicts an exemplary visual indication of comments represented iconically on the "document" representation, but these are themselves links to other KUs, which happen to be temporal-based "comments" that the visual display says to display in a list based on the temporal aspect of the KU.

In the same way, other KUs can be represented in these same spaces. FIG. 12 depicts a desired representation that is a visual indication of comments 1401 represented iconically on the document representation, but which are themselves links to other KUs, which happen to be temporal-based "comments" that the visual display says to display in a list based on the temporal aspect of the KU. In the knowledge model, a user would see the graph, with the KU of the document referencing one or more CKU sections of the document, and the CKU section referencing one or more document artifact KUs, and those KUs referencing APM actions, linked comments, as well as other potential C/KUs that may or may not be visualized based on the visual model associated with this specific CKU. Like all other relations, a comment CKU may be linked to any CKU or KU.

Exemplary Use Cases

There are any number of uses cases for the system and method of the invention. Some are discussed here in exemplary fashion. These exemplary use cases are meant to be illustrative of the use of the claimed invention, and not limiting as to the overall breadth and scope of the claimed invention.

Figure 13:
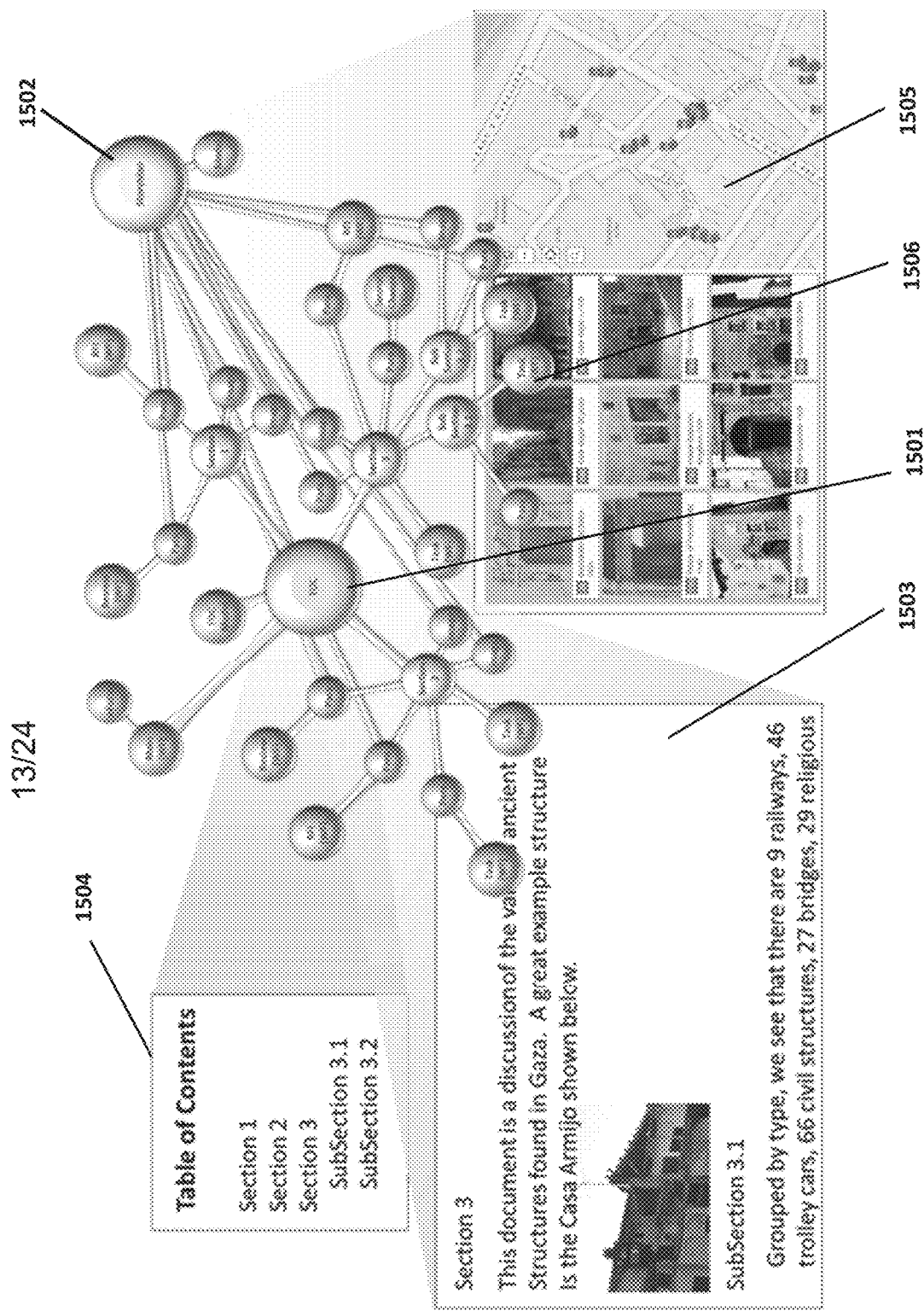
FIG. 13 depicts an exemplary knowledge store with many C/KUs with a couple of key CKUs, namely the TOC and the Storymap.

Referring now to FIG. 13, we see the knowledge store with many C/KUs with a couple of key CKUs—the TOC and the Storymap. These have attached models that define the look and feel of the KUs they are containing, even though both CKUs are containing most of the same KUs. As can be seen in the image, the TOC generates a table of contents (which could have various iconic decorators for actions and activities currently related to C/KUs shown but kept off the image to simplify the concept). One of those sections defined in the TOC is displayed below that. Notice the image and text from the model. Finally, a Storymap is displayed, which shows the various images discussed in the "document" visualization, but in a more map-centric display. Clicking on an image shows the same paragraphs associated with those images from the knowledge model. Thus, we can see that with the same data, I can get multiple visualizations of the source knowledge units—all being reused within the visualization as driven by the visualization model.

Still referring to FIG. 13, an exemplary Target System Analysis (TSA) use case of the system and method is depicted. FIG. 13 represents of an exemplary data model of a TSA: each ball (or node) is potentially a Container Knowledge Unit or Knowledge Unit. The two CKUs are indicated as a TOC CKU 1501, and a StoryMap CKU 1502. TOC CKU 1501 outputs and displays the desired representations 1504 and 1503, which are defined by the user to be more traditional table of contents views of the KUs, semantically organized into sections and subsections. The other CKU, the StoryMap CKU 1502, outputs and displays the desired representations 1505, which contains a map view with photographs tagged to locations on the map. The paragraphs, images, and workflow instance balls such as 1506 represent KUs.

Figure 14:
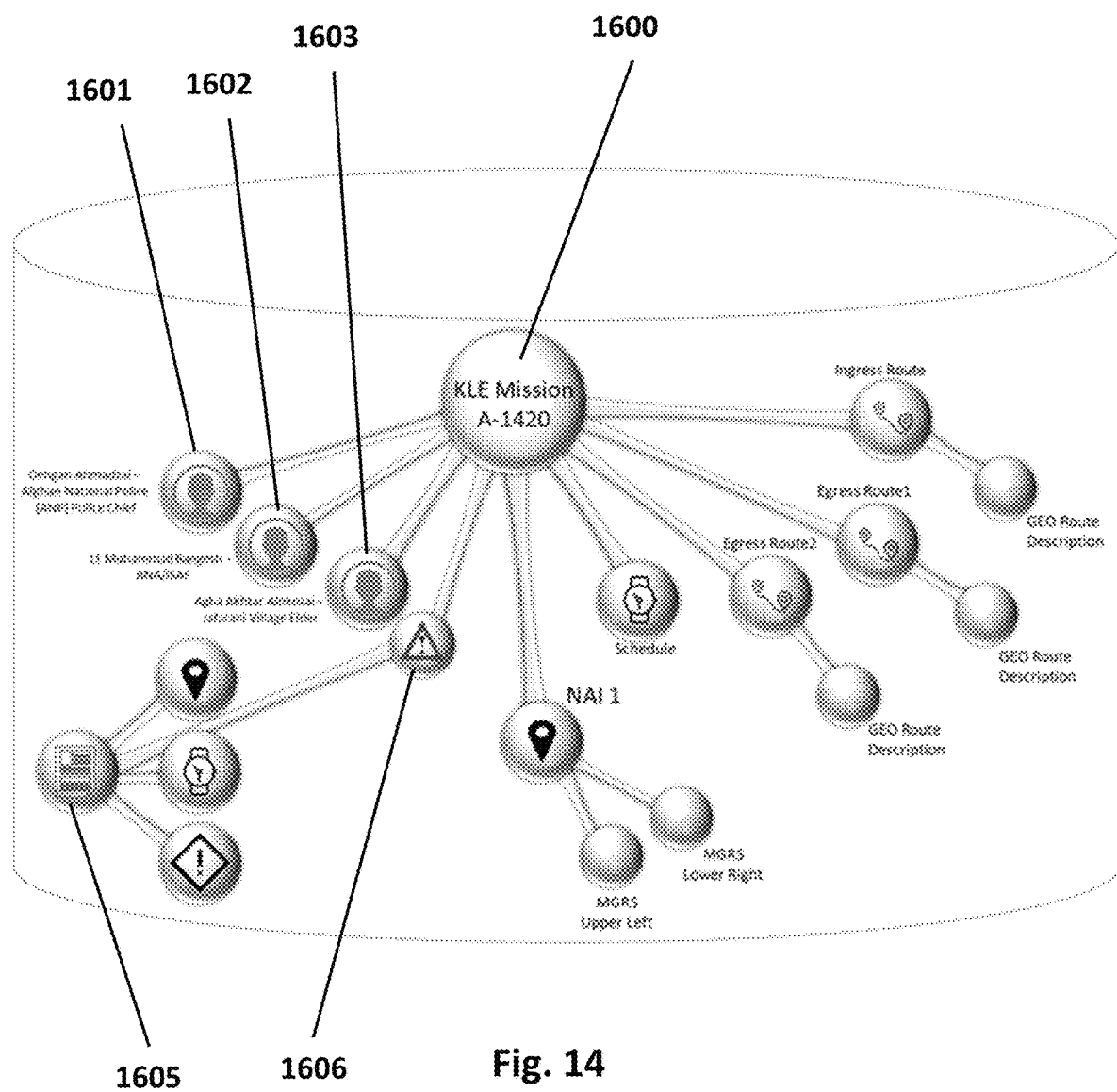
FIG. 14 depicts an exemplary (i.e., non-limiting) Knowledge Store (with a Key Leader Engagement (KLE) mission highlighted) use case of the invention.

Referring now to FIG. 14, an exemplary use case is depicted. In this example, a creator of mission intends to engage with a group of key leaders of a local force: key leaders 1601, 1602, and 1603, each represented by a KU that is entered into the system. The mission itself is a CKU 1600. The user enters this information in the form of KUs and a CKU into a Knowledge Store. The method and system of the invention now operate to identify and semantically display relevant relationships with other KUs in the Knowledge Store. For example, shown in the lower left is an ISR report KU 1605 that had been entered by a different unit. That report KU 1605 mentions a specific leader as well as concerns about this leader's allegiance, and is thus, auto-linked to that key leader KU. Because of this auto-linking, a change to the key leader KU initiates an APM process for a new relationship. That process looks for concepts such as "Active Missions" or "Active Collects", or other sematic concepts and sees that, in fact, there is an active mission CKU 1600, and the key leader is attached to that mission. The APM immediately generates an alert 1606 to notify the creator of the mission that there is some concern about one of the leaders they are going to meet so that the concern can be noted in case it impacts that mission. This alert may be automatically displayed in CKU 1600, alerting the creator of mission CKU 1600 that there is a potential issue with that key leader. Importantly, this APM process automatically causes the output of CKU 1600 to be updated, with a "push" process, without the need for a refresh or re-synch requirement on the part of the creator 1600. Because of the various KUs, their reuse, the semantic understanding by the system of what each KU represents and how concepts defined semantically can be expressed, completely independent operations on those KUs can have a cascading impact to other KUs in the system that couldn't happen otherwise under the systems of the prior art. The output display desired representation of this use case may be a mission brief, for example.

Figure 15:
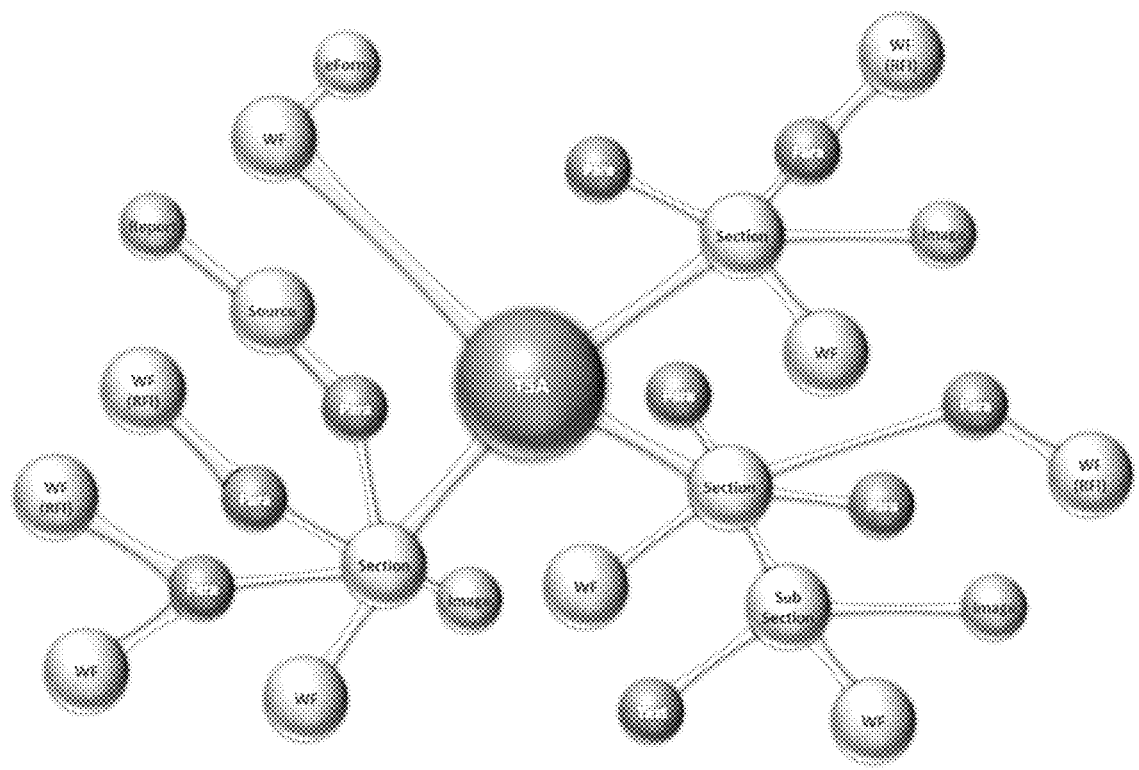
FIG. 15 depicts an exemplary Target System Analysis (TSA) use case of the invention.

Referring now to FIG. 15, an exemplary Target System Analysis (TSA) use case is depicted. FIG. 15 represents an exemplary data model of a TSA: Each ball (or node) is potentially a Container Knowledge Unit or Knowledge Unit. Below, the TSA, Sections, and Sources are CKUs, the paragraphs (labeled "para"), images (labeled Image), text portions (labeled "test") and workflow (labeled "WF") instance balls represent KUs.

TSA Intelligence production management is difficult, with limited visibility into the actual state of the production process. It is manually tracked, which places a large cognitive burden on the analysts managing the production, as well as those analysts working on elements of the document within the production. TSAs are static .pdf documents that atrophy the moment they are published. This results in:

TSA products that do not provide up-to-date assessments on capabilities and vulnerabilities Limited reusability of the information Lack of searchability Limited post-production collaboration capabilities Lack of shareability—since a text blob has no understanding of the security markings, the computer can't assist in generating a version of the document at an appropriate level of security for other units or even collation partners. The fine-grained control of the knowledge artifacts allows the computer to automatically generated a "document" on-the-fly based on the user's access privileges—without the generators of the document creating several versions for different classification levels.

No external access to a partially completed TSA during production, resulting in a lack of situation awareness for planners and product requestors The capabilities of the system and method of the invention solves all the above problems.

Fine-grained Searches—due to the level of granularity of the data being tracked with each KU. The below searches are not able to be serviced in existing systems, and due to the semantic makeup of the knowledge store, the searches themselves are far more powerful than Boolean searches found in standard databases.

This analyst was discovered to be acting as a double agent. Exactly what documents, and which content (down to the specific artifact level) in the document did s/he edit?

Reports indicate that a formally reliable resource had his family kidnapped 3 weeks ago. Show me any documents who utilize any sources by this resource within the last three weeks.

Show me only paragraphs that were modified in this date range, by this analyst, with this security marking or above, where this source was used.

The analyst who just logged in can only see Secret and below. Show me the document with all artifacts above Secret removed (this will happen automatically based on security credentials of the logged in analyst). Under the teachings of the prior art, the document may only contain one paragraph marked TS, and the whole document becomes unreachable for an analyst who could still have access to over 99% of that document.

Users performing searches from external systems can discover paragraphs containing needed information, not a multi-hundred page report that they then have to pull down and search to validate it is a match to what they are looking for.

Fine-grained understanding of the characterization of each artifact in the document:

For AI/ML, each KU can be analyzed accurately as to the analyst's accuracy as well as the trust of the source(s) used to generate the KU. This is a critical element in intelligence today—each and every document artifact must consider the trust and accuracy for use in planning or trying to understand the bigger picture, whereas today, most of this information is lost as the information flows to higher order decision makers—and thus, they have to treat the complete document at the same level of trust and accuracy;

The user must treat the whole document at the highest level of security, even if only one or just a few artifacts are marked at that level—meaning that if it was just one paragraph marked at top secret, and all the rest at secret, the whole document must still be treated as top secret -preventing access to much information that they should have access to.

Figure 16:
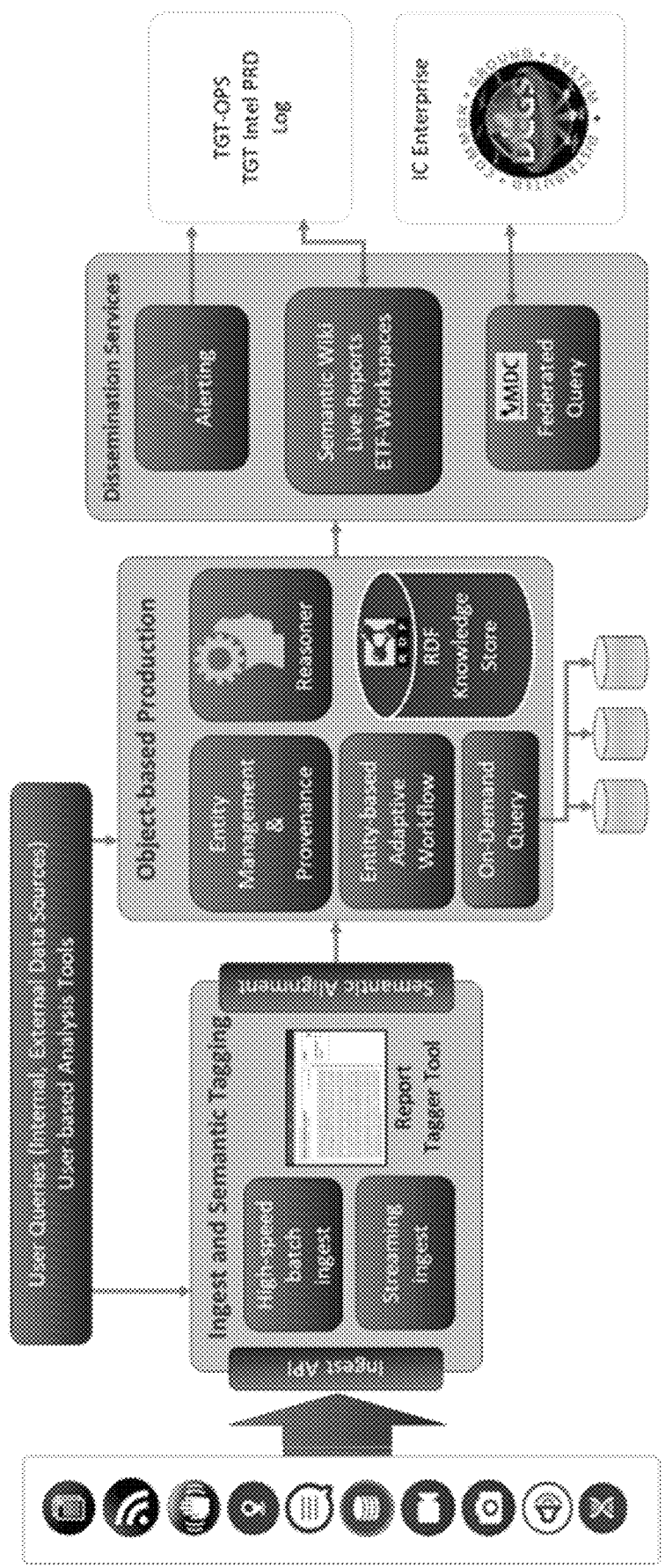
FIGS. 16 and 17 depict back end concepts to support Fine-grained search capability.
Figure 17:
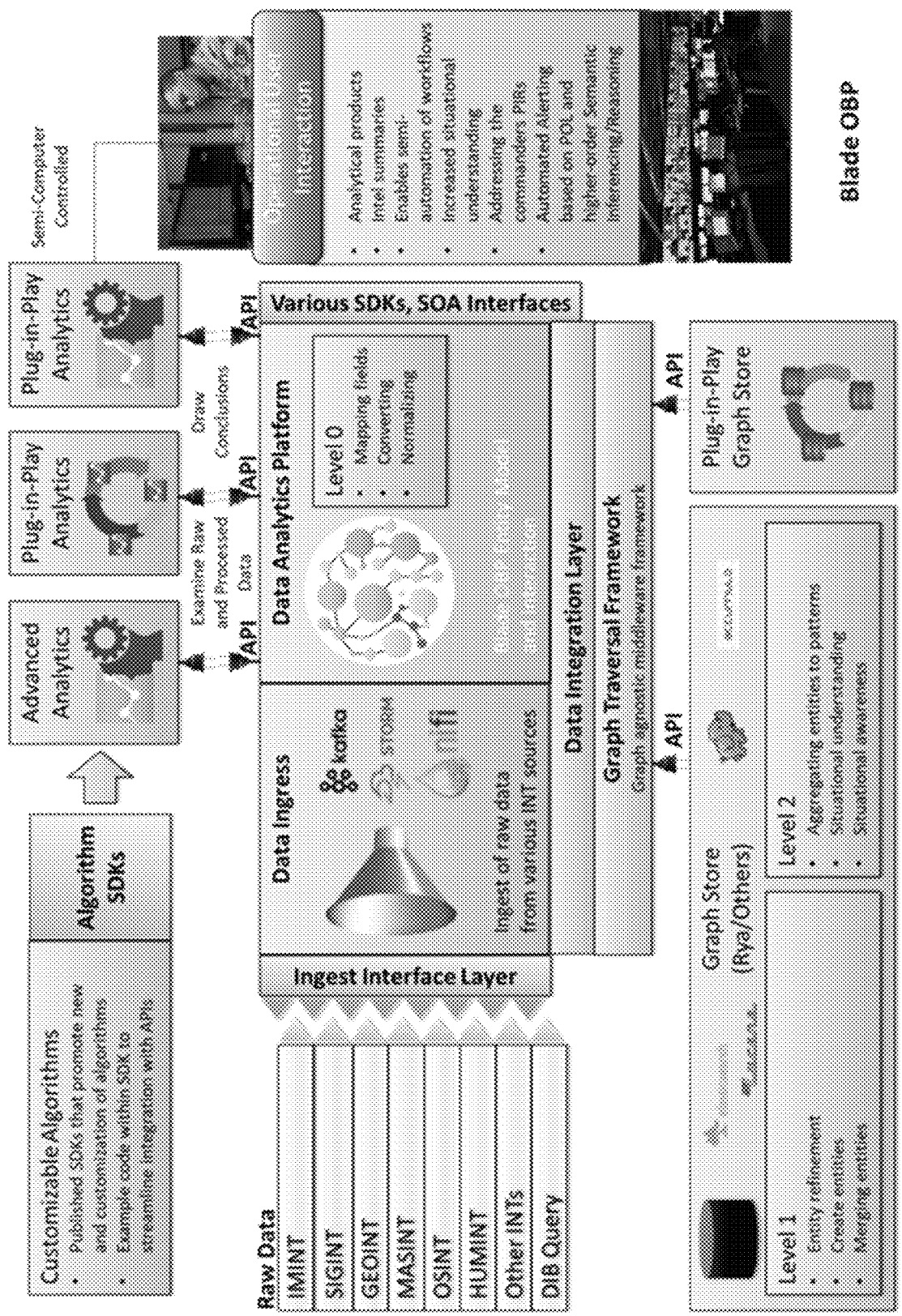

FIGS. 16 and 17 depict back end concepts to support fine-grained search capability.

Figure 18:
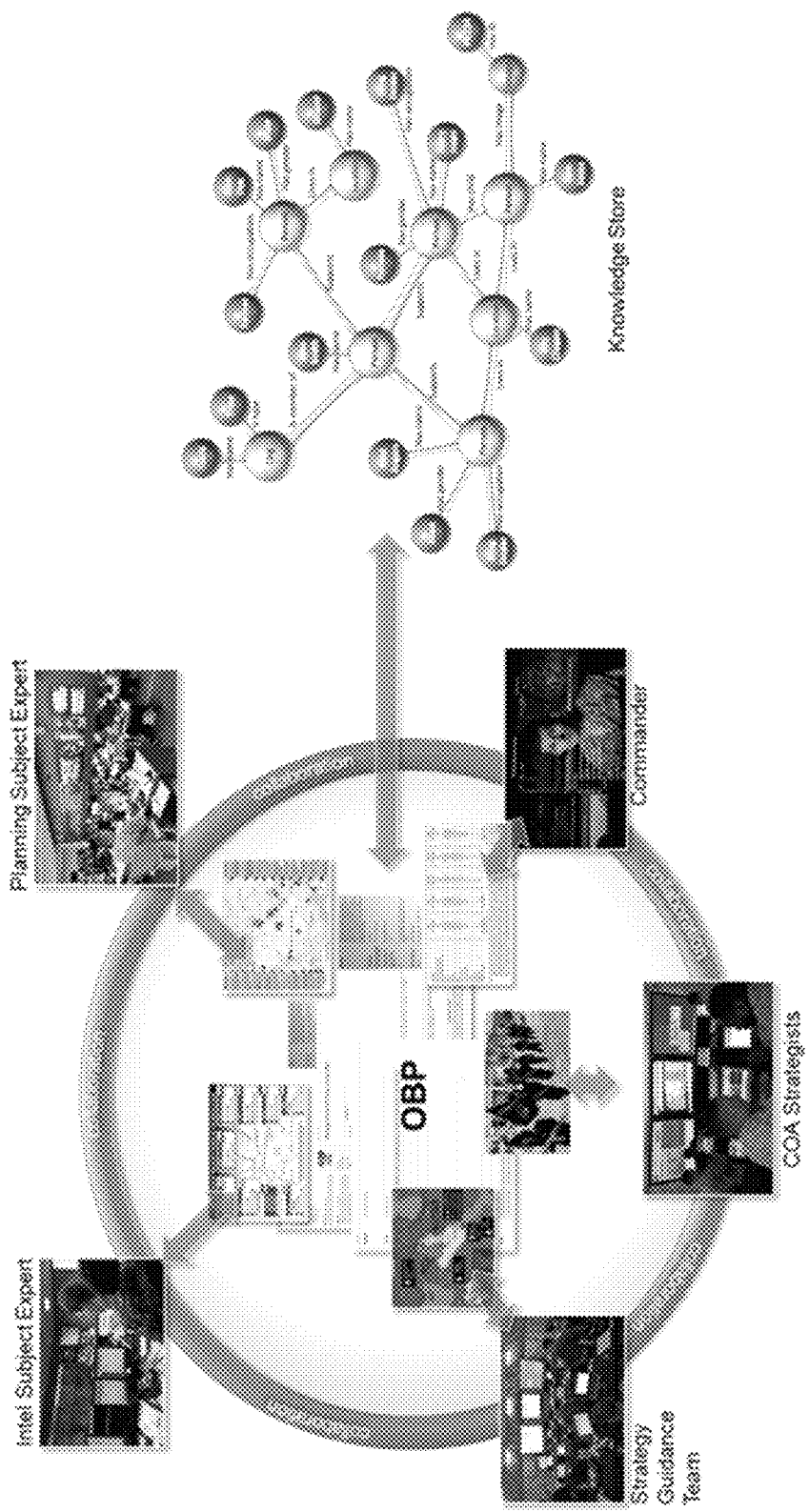
FIG. 18 depicts the concept that, with the KUs able to be used across various operational constructs, more information automatically flows back into the knowledge store, making anything else using the KUs "smarter".

Referring now to FIG. 18, with the KUs able to be used across various operational constructs, more information automatically flows back into the knowledge store—making anything else using the KUs "smarter".

Figure 19:
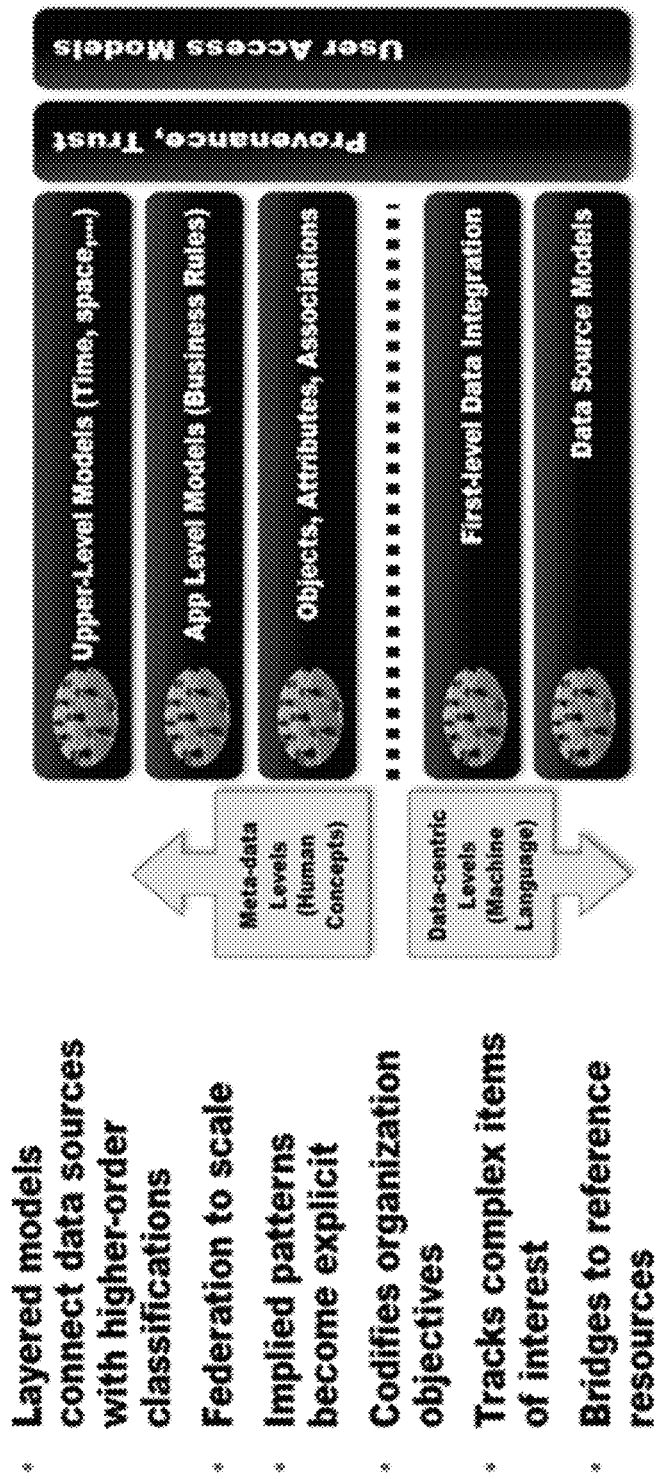
FIG. 19 depicts layered ontologies of an embodiment of the invention.

Referring now to FIG. 19, layered ontologies of an embodiment of the invention are depicted, these layered ontologies enabling various operational concepts to be defined by different models, and at different levels, supporting different visualization concepts and understanding over the same base data (or KUs).

Figure 20:
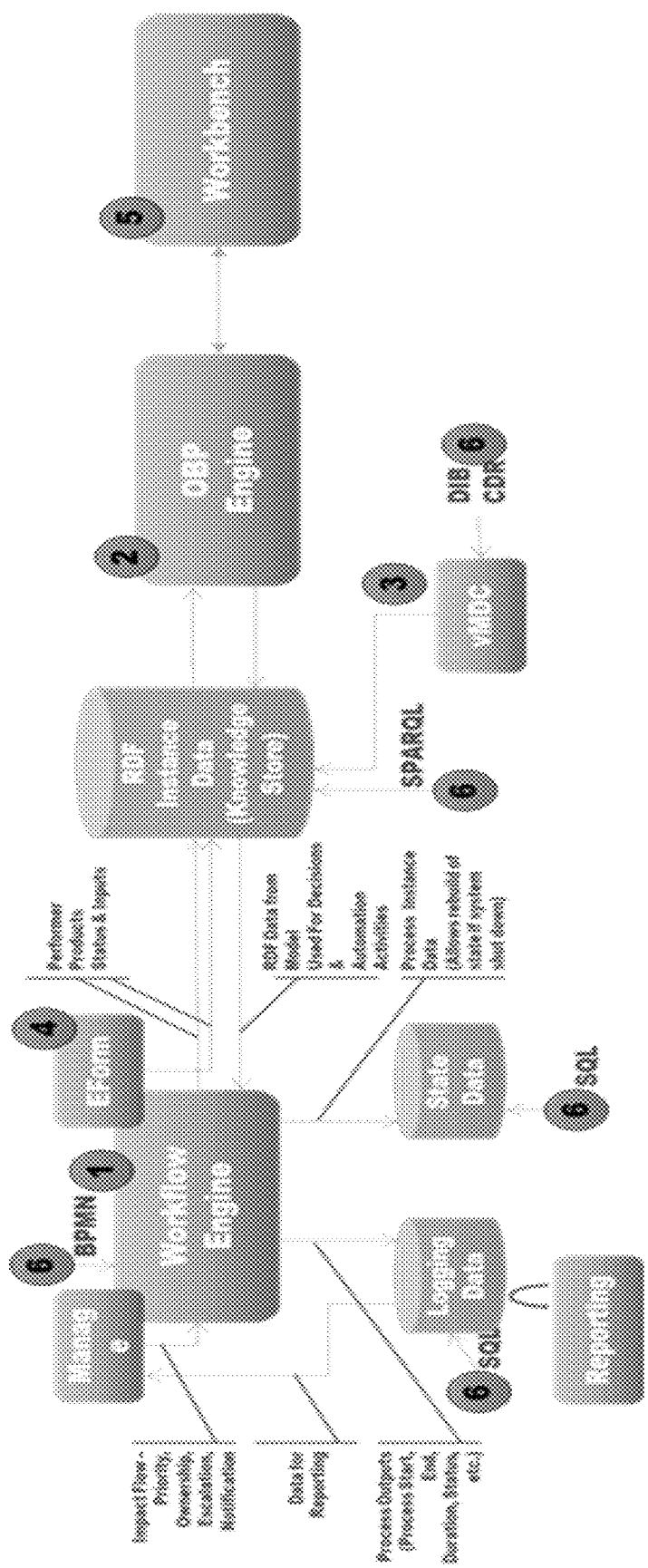
FIGS. 20, 21, and 22 depict the structure of exemplary embodiments of the system and method of the invention.
Figure 21:
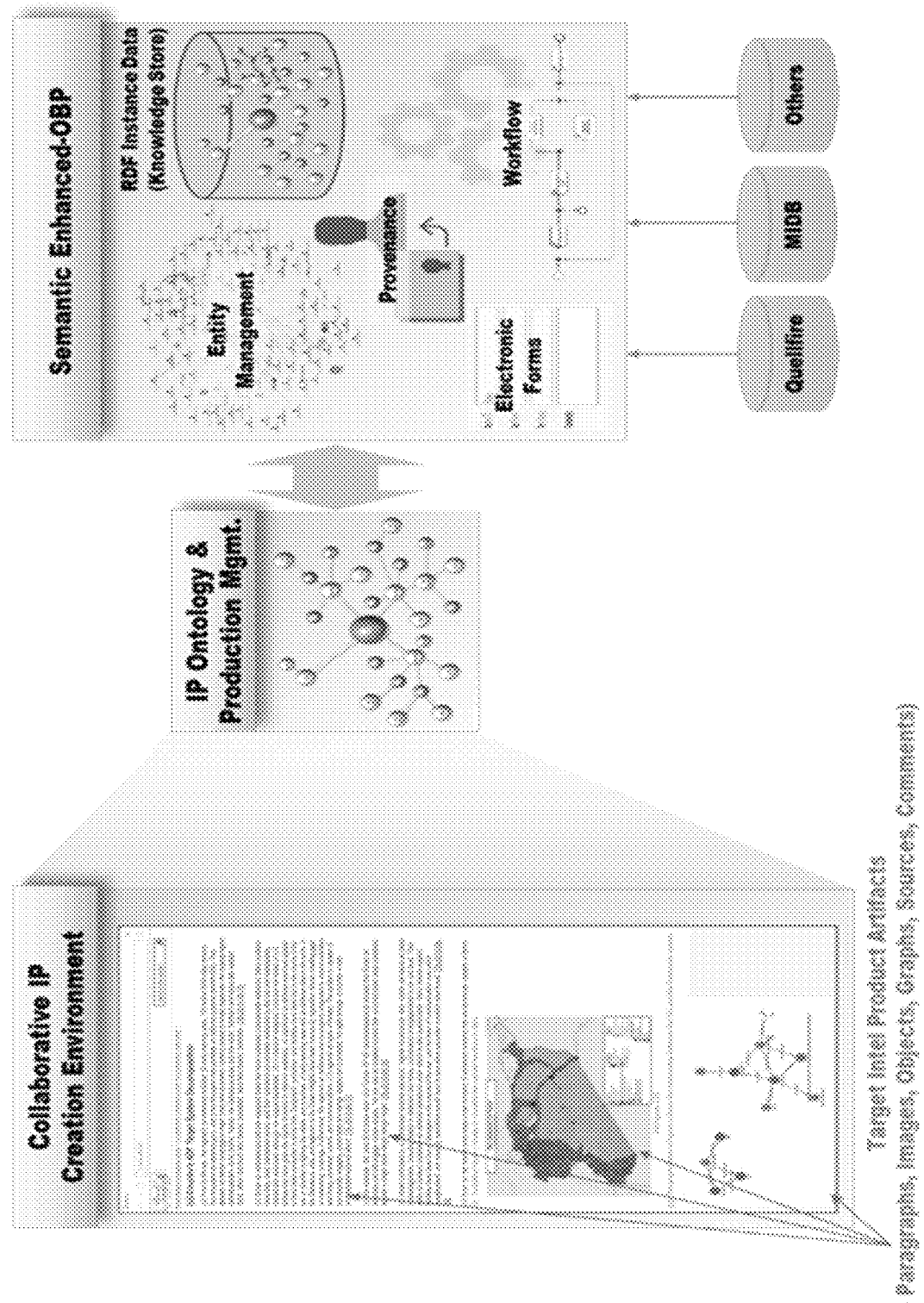
Figure 22:
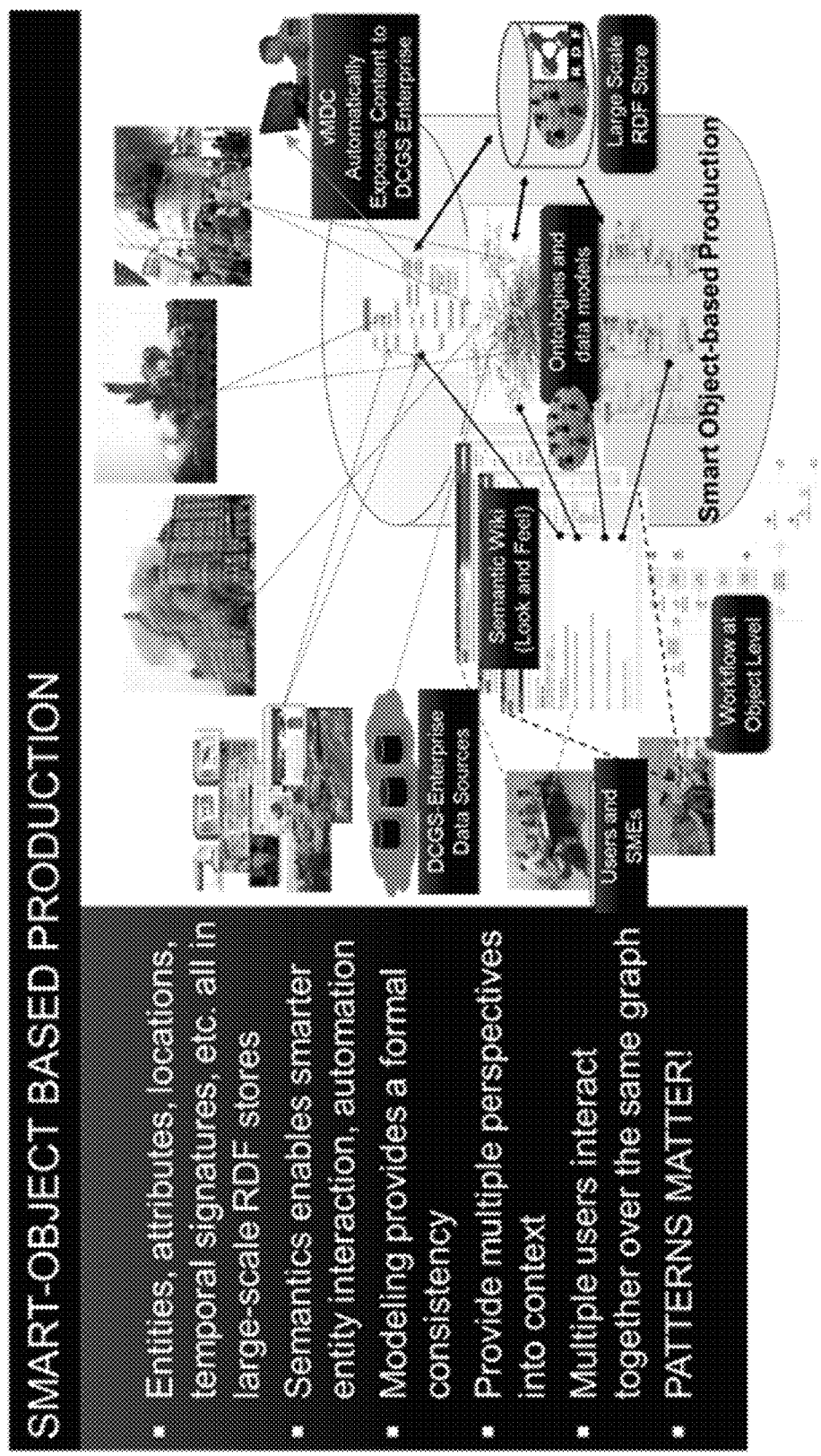

Referring now to FIGS. 20, 21 and 22 the structure of exemplary embodiments of the system and method of the invention are depicted.

Further supporting information regarding the system and method of the invention are provided in the following paragraphs.

Intelligence is one way of getting information to better know the enemy. However, intelligence is more than information. Information on its own may be of utility to the commander, but when related to other information about the operational environment and considered in the light of past experience, it gives rise to a new understanding of the information, which may be termed 'intelligence.' The goal of intelligence is to provide information and assessments to facilitate successful mission accomplishment. To meet this goal, intelligence operations include: inform the commander, describe the operational environment; identify, define, and nominate objectives; support planning and execution of operations; counter adversary deception and surprise; support friendly deception efforts; and assess the effectiveness of operations.

Intelligence is of greatest value when it contributes to user's decision-making process by providing a variety of assessments and estimates that facilitate understanding the operational environment and offer up multiple courses of action (with appropriate risks and outcomes) to accomplish a user's objective. However, intelligence analysts are faced with the overwhelming task of dealing with immense volumes of complex data from multiple sources. The data must be evaluated and correlated to generate the intelligence necessary to support their users. Worse, there are several different organizations generating the intelligence, with many of them siloed, which prevents a shared situational awareness, creates duplicative effort, and creates a multitude of finished products that forces the users of that intelligence to try and determine the bigger picture, resolve differences between the reports (which lacks the contextual "why" the specific analyst came to their conclusions), and quickly create the appropriate assessment of a situation. With all that information available, it is surprising to hear that the requirement to have intelligence available to the decision maker in a timely fashion remains unfulfilled. Also, these finished products tend to atrophy the moment they are published, with the IC creating various updates that are published as version changes or even small update documents that force the user to try and recreate a mental picture of the "current state" of the intelligence, even though it could be spread through multiple documents. The system and method of the invention provides a better way, using a semantically driven approach, that creates a "living intelligence" environment, where the concept of static reports is replaced with an intelligence information knowledge base, presenting information dynamically, and in various output formats designed to best serve the decision maker.

Figure 23:
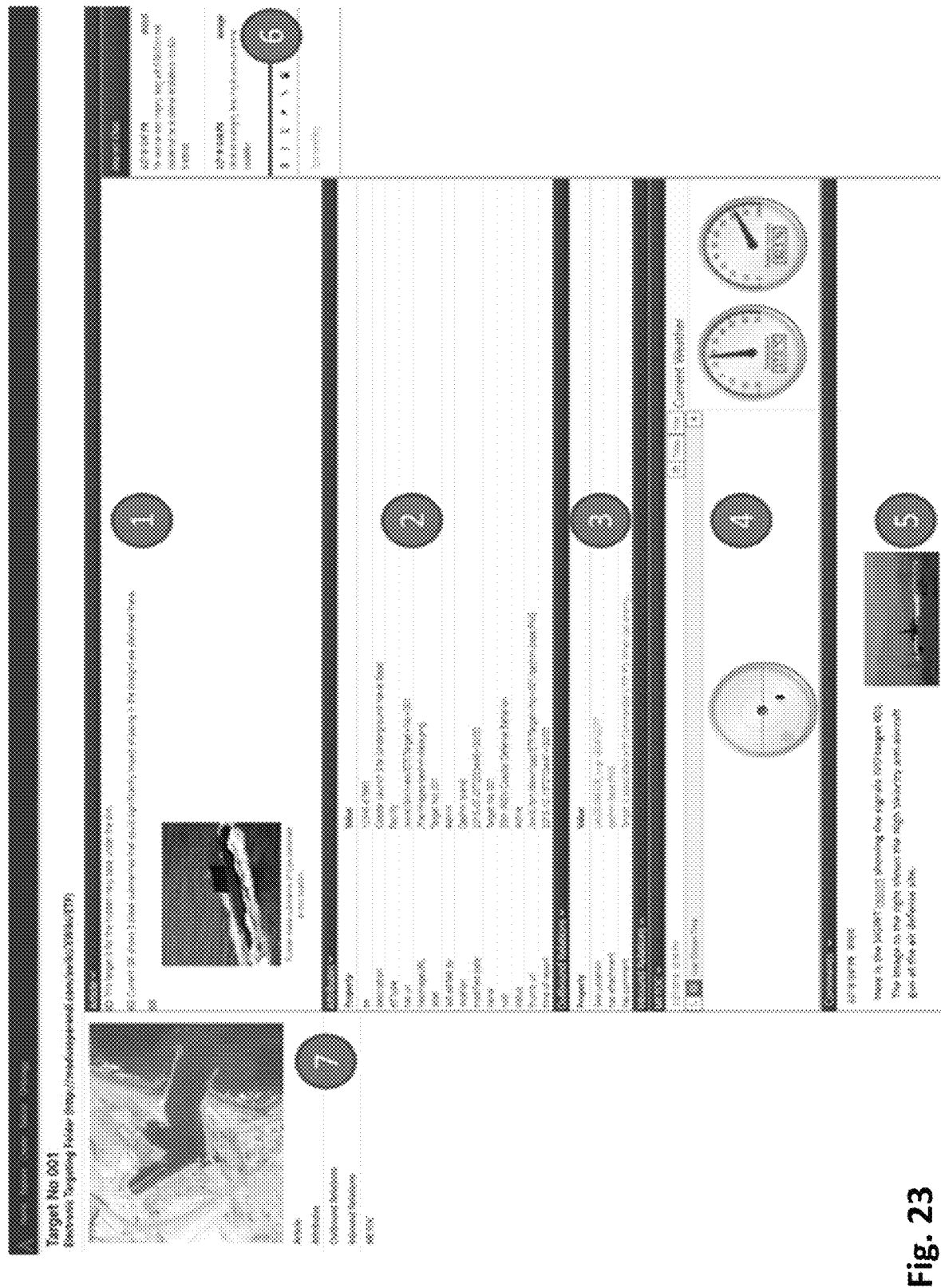
FIG. 23 depicts a representation of an entity in the semanic-OBP system of the invention.

FIG. 23 shows one representation of an entity in the semantic-OBP system. The numbered components are: 1) a "free-text" area (only in look and feel—each artifact is a self-contained object within the overall entity), 2) structured attributes about overall entity, 3) links to other relationships to this entity, including auto-discovered related reporting, 4) live weather showing plug-in capability of wiki, 5) full WYSIWYG entity-level commenting, 6) chat specifically associated with this entity, and 7) default multi-media object associated with the entity.

Figure 24:
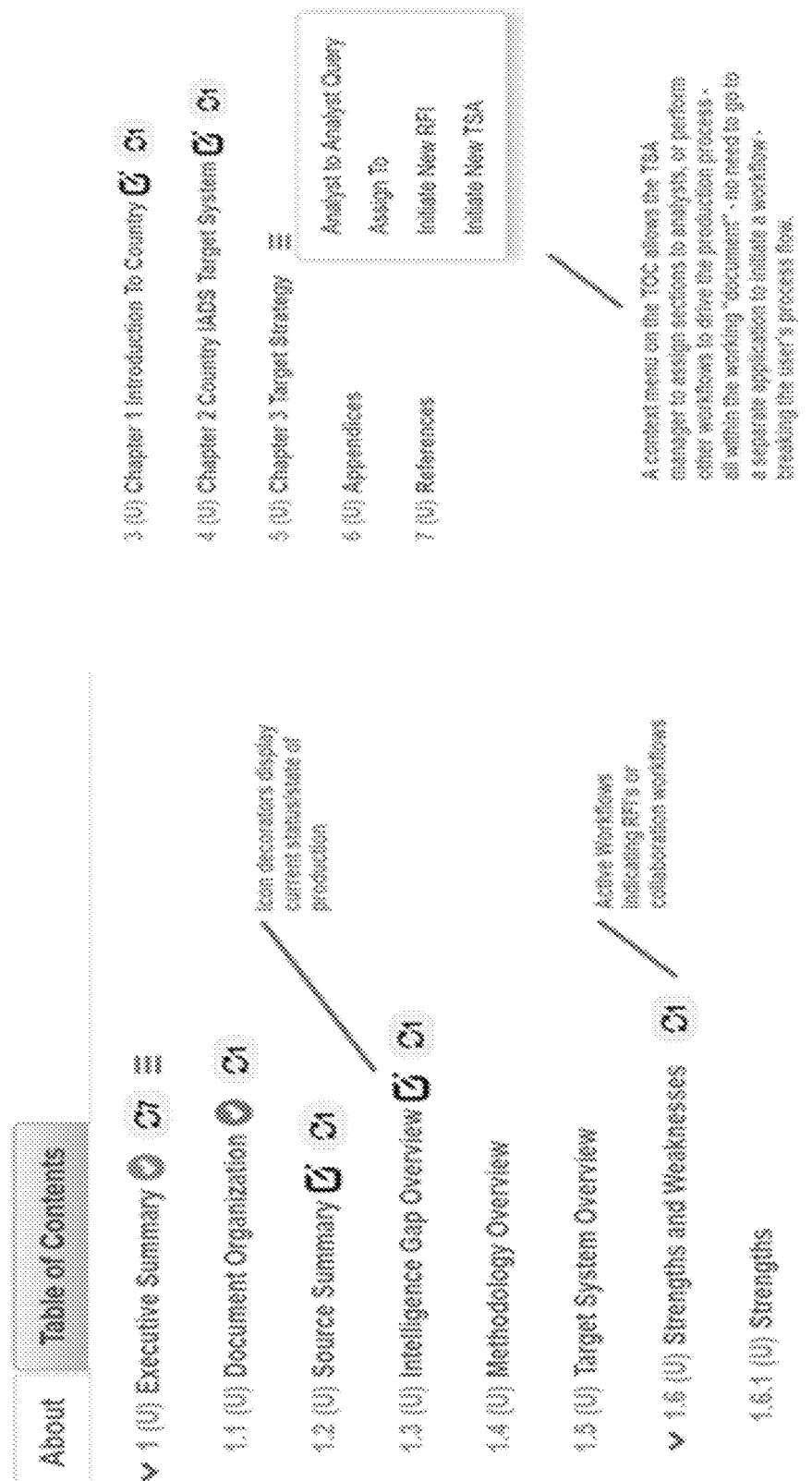
FIG. 24 depicts an integrated APM, demonstrating the continuous update to the product.

FIG. 24 demonstrates the integrated APM within a logical "product" represented in the semantic-OBP. Each of the icons represent multiple status states from within the workflow. Of note, the production workflow can change in the backend through a management tool, but that change does not impact the GUI. The GUI reads the model of the document and constructs the representation, along with any status information on-the-fly. Instead of a separate workflow tool, the workflow initiation and statusing is presented directly in the context of the work the analyst is doing. As new workflows are created and appropriately tagged, they show up automatically in the list of available options the user can perform on an object within the GUI.

Any artifact or object can have one or more workflow processes associated with it—not just a simple task assignment which third-generation wikis call workflow (though it can be as simple as that). The workflow is an enterprise-class BPMN-based production environment, with complex routes where multiple decision points are possible, though hidden from the UI at this level. Users can view any active workflows against any entity (including artifacts) to see if other analysts or users are performing active production, updates, or missions associated with that entity.

To show how this could be leveraged, imagine a patrol is about to do a Key Leader Engagement (a meeting to discuss any number of things to help improve relations with that Key Leader). As they review their mission profile, they see the Key Leader entity. They notice two active workflow processes: their mission plan and an ISR collect process. Unsure why they have an active ISR collect going on, they drill into that process to discover that there is active surveillance based on new intelligence that the Key Leader has been holding clandestine meetings with known hostile forces. Thus, a completely different unit has imparted knowledge into the system by applying an ISR request, and the patrol leader can then determine if that new information impacts his current mission.

The semantic OBP of the invention provides the capabilities to create the living intelligence environment, managing data in a more fine-grained approach, with deep-level provenance, and stored within a dynamic knowledge store. Doctrinal "products" can still be produced, but the creation of the knowledge behind those products in the living intelligence environment enables that knowledge to be represented in multiple forms, from something that looks like a document, a slide show, dots on a map, a story map, or other visualization concepts—dynamically representing intelligence in the best form possible for consumption by the decision maker, resulting in faster, better informed decisions.

The system and method steps of the embodiments of the invention may be implemented or carried out by a computer or plurality of computers executing non-transitory computer readable and executable instructions. Each computer may comprise a controller, processor, hardwired logic or equivalent physical electronic structure that is capable of reading and executing non-transitory computer readable and executable instructions for carrying out the method steps of the invention. Such instructions may be stored in local, remote or distributed hardware memories or computer readable media in communication with said controller, processor or equivalent structure. The computer or plurality of computers of the invention may be in communication with one another and with other electronic devices including other computers, mobile electronic devices such as smart phones and tablets having visual displays, communications servers, and other electronic and communication hardware forming communication links such that the computer or plurality of computers of the invention are accessible by users using such communication links. Such communication links include, but are not limited to, cellular telephone data links, dedicated RF communication links including all known cellular telephone standards, satellite and terrestrial communication links, proprietary communication links, WiFi®, Bluetooth®, Near Field Communication (NFC), optical communication links, and any form of wired or wireless communication links. The invention may be web-enabled, meaning that may operable to be addressed by, and to communicate with, other devices on the World Wide Web through an Internet connection. Such communication may be through a web portal instantiated in software running on a computer of the system that is operable to communicate with users at any location, meaning that users are not required to be co-located with the computers of the system.

As used herein, "software" includes within its meaning a collection of non-transitory computer readable and executable instructions for carrying out the steps of a process or method.

In embodiments, the system of the invention my comprise software for editing the content of a KU, a CKU, defining header information, and defining desires representations, such as outputs, for visual display.

As used herein, "memory", "medium", "media", "computer readable memory", "computer readable media", "computer readable medium", "storage media", "computer readable storage media" and "computer readable storage medium" shall include within their meanings only physical non-transitory computer readable hardware, and such terms shall specifically exclude signals per se, carrier waves, propagating signals and other transitory signals. Such physical non-transitory computer readable media may comprise hardware memory that comprises a physical structure for storing data which may include computer executable instructions or data. All of the above may be in communication with the processing circuitry of the invention such that a processor or other element of the invention that is capable of reading and executing non-transitory computer readable instructions is operable to read such instruction, and write data to memory, as may be required to carry out the steps of the invention.

The electronic devices described herein may comprise a processor or other processing circuitry in communication with the other elements of the invention described herein. As used herein, the term 'circuitry' refers to at least all of the following: hardware-only implementations (such as implementations in only analog and/or digital circuitry) and to combinations of circuits and software and/or firmware such as to a combination of processors or portions of processors/software including digital signal processor(s), hard-wired logic, programmable logic devices, logic arrays, software, and memory(ies) that work together to cause an apparatus, such as a computer, mobile phone, tablet or other electronic device, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware.

Embodiments of the invention may be implemented in software, hardware, application logic or a combination of software, hardware, and application logic. The software application logic and/or hardware may reside on the apparatus, a separate device, or a plurality of separate devices, all of which may be in communication with one another by any known means, wired or wireless. If desired, part of the software application logic and/or hardware may reside on the apparatus, part of the software, application logic and/or hardware may reside on a separate device, and part of the software, application logic and/or hardware may reside on a plurality of separate devices. In an example embodiment, the application logic, software, or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer. A computer readable medium may comprise a computer-readable storage medium that may be any tangible media or means that can contain or store the instructions for use by or in connection with an instruction execution system, apparatus, or device, such as a computer.

Embodiment of the invention may also comprise user input/output devices such as, but not limited to, one or more keyboards, microphones, scanners, cameras and circuitry and software forming interfaces for receiving data such as RF, optical, serial electrical, and serial parallel data ports, portable readable memory devices such as a solid state memory devices or hard disk drives that inserted into, or connected to, a communication port of the invention, all of which may be in communication with a processor or processors of the invention. All of the above may be utilized to enter data into a computer of the system of the invention. The system of the invention may also comprise one or more visual displays, printers or audio ports including speakers, all in communication with a processor of the system, for the display of output information generated by, stored on, or passed through the system.

What is claimed is:

1. A computer-implemented method for dynamically creating and managing content by tracking and maintaining subjective accuracy of the content, the content comprising a plurality of independently editable knowledge units, and producing a desired representation of information the editable knowledge units, using semantic object-based production of information and adaptive process management of such information, the method comprising:

receiving a user query for at least one of content creation and management;

identifying at least one characterizing attribute of a first plurality of knowledge units, wherein a knowledge unit is defined as comprising a knowledge artifact that is editable independently from other knowledge units;

storing, in an independent record in a knowledge store or database, information describing the attributes of each of said first plurality of knowledge units;

identifying one or more desired logical representations of said information from the user query;

identifying, through a semantic object-based production process, which of said first plurality of knowledge units contain information related to said one or more desired logical representations, forming a second plurality of knowledge units that are a subset of said first set of knowledge units, said second plurality of knowledge units being related to one another with respect to the user's specific need as identified from the user query; and displaying said second plurality of knowledge units in said one or more desired logical representations to said user.

2. The method of claim 1, wherein said second plurality of knowledge units is saved as an independent record as a container knowledge unit having its own attribute data saved in said independent record in said knowledge store or database.

3. The method of claim 1, wherein said information describing each of said plurality of knowledge units is further defined as comprising provenance information about that knowledge unit.

4. The method of claim 1, wherein said information describing each of said plurality of knowledge units is further defined as comprising security information about that knowledge unit.

5. The method of claim 1, wherein said information describing each of said plurality of knowledge units is further defined as comprising information about sources that provided the information comprising that knowledge unit.

6. The method of claim 1, wherein said information describing each of said plurality of knowledge units is further defined as comprising workflow instance information about that knowledge unit.

7. The method of claim 2, wherein said container knowledge unit attribute data comprises container knowledge unit owner information for that container knowledge unit.

8. The method of claim 2, wherein said container knowledge unit attribute data comprises a workflow record of one or more of the knowledge units providing information to said container knowledge unit.

9. The method of claim 1, further comprising the steps of a user of said one or more desired logical representations making a determination to update the information comprising at least one of said knowledge units, editing the information comprising the knowledge unit, and saving the knowledge unit to the knowledge store.

10. The method of claim 9, further comprising the step of using adaptive process management to perform the steps of:
   recognizing that the information comprising the knowledge unit has been changed;
   searching the knowledge store to identify any container knowledge units that comprise information from the changed knowledge unit; and
   notifying the owner of each identified container knowledge unit that the knowledge unit has changed.

11. The method of claim 1, further comprising a container grouping of knowledge units wherein each of said knowledge units is based on a model, forming a container knowledge unit.

12. The method of claim 1, further comprising the use of a dynamically applied ontology and an integrated adaptive process management in information creation, and further comprising a management system comprising one or more editors for driving appropriate structure and tracking in said step of displaying, and wherein said attributes are identified at an atomic level.

13. The method of claim 2, wherein said container knowledge unit is based on a model.

14. The method of claim 2, further comprising the step of dynamically applying an ontology for creating said desired representation, and further comprising a management system comprising an editor for defining the use of said ontology in creating said desired representation, and for editing said desired representation.

15. A system for dynamically creating and managing content to track and maintain subjective accuracy of the content, the content comprising a plurality of independently editable knowledge units, and producing a desired representation of information from the editable knowledge units using semantic object-based production of information and adaptive process management of such information, the system comprising:
   a computer or computer system, wherein said computer or computer system comprises a controller or processor in communication with a user interface and in communication with a computer readable medium comprising non-transitory computer readable and computer executable instructions comprising:
   receiving a user query for at least one of content creation and management;
   identifying at least one characterizing attribute of a first plurality of knowledge units, wherein a knowledge unit is defined as comprising a knowledge artifact that is editable independently from other knowledge units;
   storing, in an independent record in a knowledge store or database, information describing the attributes of each of said first plurality of knowledge units;
   identifying one or more desired logical representations of said information from the user query;
   identifying, through a semantic object-based production process, which of said first plurality of knowledge units contain information related to said one or more desired logical representations, forming a second plurality of knowledge units that are a subset of said first set of knowledge units, said second plurality of knowledge units being related to one another with respect to the user's specific need as identified from the user query; and
   displaying said second plurality of knowledge units in said one or more desired logical representations to said user.

16. The system of claim 15, wherein said second plurality of knowledge units is saved as an independent record as one or more container knowledge unit having its own attribute data saved in said independent record in said knowledge store or database.

17. The system of claim 16, wherein said information describing each of said plurality of knowledge units is further defined as comprising at least one attribute selected from the group consisting of security information about each knowledge unit, provenance information about each knowledge unit, workflow information for each knowledge unit, and information about the sources that provided the information comprising each knowledge unit.

18. The system of claim 15, wherein said computer readable medium further comprises non-transitory computer readable and computer executable instructions for an adaptive process to perform the steps of:
   recognizing that the information comprising the knowledge unit has been changed;
   searching the knowledge store to identify any container knowledge unit that comprise information from the changed knowledge unit; and
   notifying the owner of each identified container knowledge unit that the knowledge unit has changed.

19. The system of claim 16, wherein said computer readable medium further comprises non-transitory computer readable and computer executable instructions for applying a dynamically applied ontology to said one or more container knowledge units.

20. The system of claim 15, wherein said computer readable medium further comprises non-transitory computer readable and computer executable instructions for searching, retrieving, viewing, editing, transmitting and storing said knowledge units and container knowledge units in said knowledge store or data base, wherein said knowledge store or data base are stored as non-transitory computer readable data located in a physical memory.

* * * * *